(12) United States Patent
Andersen et al.

(10) Patent No.: US 11,157,725 B2
(45) Date of Patent: Oct. 26, 2021

(54) GESTURE-BASED CASTING AND MANIPULATION OF VIRTUAL CONTENT IN ARTIFICIAL-REALITY ENVIRONMENTS

(71) Applicant: Facebook Technologies, LLC, Menlo Park, CA (US)

(72) Inventors: Daniel Andersen, Redmond, WA (US); Albert Peter Hwang, Seattle, WA (US); Kenrick Cheng-Kuo Kin, Vancouver, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/819,938

(22) Filed: Mar. 16, 2020

(65) Prior Publication Data

US 2020/0279104 A1 Sep. 3, 2020

Related U.S. Application Data

(63) Continuation of application No. 16/020,407, filed on Jun. 27, 2018, now Pat. No. 10,635,895.

(51) Int. Cl.
*G06K 9/00* (2006.01)
*A63F 13/573* (2014.01)
(Continued)

(52) U.S. Cl.
CPC ........ *G06K 9/00355* (2013.01); *A63F 13/573* (2014.09); *G02B 27/0172* (2013.01); *G06F 3/013* (2013.01); *G06T 19/006* (2013.01)

(58) Field of Classification Search
CPC ............. G06K 9/00355; G06K 9/4628; G06K 9/6274; G06K 9/00597; G06K 9/00671;
(Continued)

(56) References Cited

U.S. PATENT DOCUMENTS 6,842,175 B1  1/2005  Schmalstieg et al.
8,982,471 B1  3/2015  Starner et al.
(Continued)

FOREIGN PATENT DOCUMENTS

CN  103105929 A  5/2013
CN  103150018 A  6/2013
(Continued)

OTHER PUBLICATIONS

United States Office Action, U.S. Appl. No. 16/020,391, dated Feb. 3, 2020, 22 pages.
(Continued)

*Primary Examiner* — Grace Q Li
(74) *Attorney, Agent, or Firm* — Fenwick & West LLP

(57) ABSTRACT

Embodiments are directed to a near eye display (NED) system for displaying artificial reality content to a user and to manipulate displayed content items based upon gestures performed by users of the NED system. A user of the NED system may perform a gesture simulating the throwing of an object to "cast" a content item to a target location in an artificial reality (AR) environment displayed by the NED system. The gesture may comprise a first portion in which the user's hand "grabs" or "pinches" a virtual object corresponding to the content item and moves backwards relative to their body, and a second portion in which the user's hand moves forwards relative to their body and releases the virtual object. The target location may be identified based upon a trajectory associated with the backwards motion of the first portion of the gesture.

15 Claims, 12 Drawing Sheets

(51) Int. Cl.
*G06T 19/00* (2011.01)
*G06F 3/01* (2006.01)
*G02B 27/01* (2006.01)

(58) Field of Classification Search
CPC ............ G06K 9/00389; G02B 27/0172; G02B 2027/0187; G02B 2027/0138; G02B 2027/014; G02B 27/0093; A63F 13/573; A63F 13/213; A63F 13/428; A63F 13/537; A63F 13/25; G06T 19/006; G06F 3/013; G06F 3/012; G06F 3/017; G06F 3/011

See application file for complete search history.

(56) References Cited

U.S. PATENT DOCUMENTS

| | | | |
|---|---|---|---|
| 9,383,895 | B1 | 7/2016 | Vinayak et al. |
| 9,594,491 | B2 | 3/2017 | Lala et al. |
| 9,965,028 | B2 | 5/2018 | Yoo |
| 10,139,906 | B1 | 11/2018 | Bai |
| 2002/0037768 | A1 | 3/2002 | Ohshima |
| 2009/0284469 | A1 | 11/2009 | Hsieh et al. |
| 2010/0020221 | A1 | 1/2010 | Tupman et al. |
| 2010/0192109 | A1 | 7/2010 | Westerman et al. |
| 2010/0194782 | A1 | 8/2010 | Gyorfi et al. |
| 2010/0306649 | A1 | 12/2010 | Russ et al. |
| 2011/0248918 | A1 | 10/2011 | Yoo et al. |
| 2011/0280441 | A1 | 11/2011 | Chen et al. |
| 2012/0113223 | A1* | 5/2012 | Hilliges ............... G06F 3/00 348/46 |
| 2012/0309532 | A1 | 12/2012 | Ambrus et al. |
| 2013/0182077 | A1 | 7/2013 | Holz |
| 2013/0201276 | A1 | 8/2013 | Pradeep et al. |
| 2013/0283213 | A1 | 10/2013 | Guendelman et al. |
| 2013/0307768 | A1 | 11/2013 | Kim et al. |
| 2014/0028567 | A1 | 1/2014 | Park et al. |
| 2014/0035913 | A1 | 2/2014 | Higgins et al. |
| 2014/0091984 | A1 | 4/2014 | Ashbrook et al. |
| 2014/0098018 | A1 | 4/2014 | Kim et al. |
| 2014/0132512 | A1 | 5/2014 | Gomez Sainz-Garcia |
| 2014/0150162 | A1 | 6/2014 | Guan |
| 2014/0240216 | A1 | 8/2014 | Bukurak et al. |
| 2014/0272866 | A1* | 9/2014 | Kim .................... G09B 9/00 434/262 |
| 2014/0298672 | A1 | 10/2014 | Straker et al. |
| 2015/0085171 | A1 | 3/2015 | Kim et al. |
| 2015/0109202 | A1 | 4/2015 | Ataee et al. |
| 2015/0146925 | A1 | 5/2015 | Son et al. |
| 2015/0201124 | A1 | 7/2015 | Litvak et al. |
| 2015/0220922 | A1 | 8/2015 | Elangovan et al. |
| 2015/0235409 | A1 | 8/2015 | Grossman et al. |
| 2015/0242101 | A1 | 8/2015 | Ishino et al. |
| 2015/0363035 | A1 | 12/2015 | Hinckley et al. |
| 2016/0100166 | A1 | 4/2016 | Dragne et al. |
| 2016/0224119 | A1 | 8/2016 | Wu |
| 2016/0320846 | A1 | 11/2016 | De Michele |
| 2016/0320853 | A1 | 11/2016 | Lien et al. |
| 2016/0349845 | A1 | 12/2016 | Poupyrev et al. |
| 2016/0349849 | A1 | 12/2016 | Kwon et al. |
| 2017/0003746 | A1 | 1/2017 | Anglin et al. |
| 2017/0031502 | A1* | 2/2017 | Rosenberg .......... G06F 3/04144 |
| 2017/0068416 | A1 | 3/2017 | Li |
| 2017/0097687 | A1 | 4/2017 | Pinault et al. |
| 2017/0116667 | A1* | 4/2017 | High .................. G06K 9/00671 |
| 2017/0131964 | A1 | 5/2017 | Baek et al. |
| 2017/0220856 | A1 | 8/2017 | Mohandes et al. |
| 2017/0228120 | A1 | 8/2017 | Phillips |
| 2017/0324841 | A1 | 11/2017 | Clement et al. |
| 2017/0357332 | A1 | 12/2017 | Balan et al. |
| 2017/0358144 | A1* | 12/2017 | Schwarz ............. G06F 3/04842 |
| 2018/0011543 | A1 | 1/2018 | Funami |
| 2018/0011628 | A1 | 1/2018 | Kano et al. |
| 2018/0075658 | A1* | 3/2018 | Lanier .................... G06F 1/163 |
| 2018/0075659 | A1 | 3/2018 | Browy et al. |
| 2018/0077409 | A1 | 3/2018 | Heo et al. |
| 2018/0101237 | A1 | 4/2018 | Lu |
| 2018/0322706 | A1 | 11/2018 | Drouin et al. |
| 2018/0336008 | A1 | 11/2018 | Nakagawa et al. |
| 2018/0342103 | A1* | 11/2018 | Schwarz ................. G06F 3/017 |
| 2018/0343023 | A1 | 11/2018 | Park et al. |
| 2018/0349690 | A1* | 12/2018 | Rhee ....................... G06F 3/016 |
| 2018/0350150 | A1 | 12/2018 | Powderly et al. |
| 2018/0359448 | A1 | 12/2018 | Harries |
| 2019/0026014 | A1 | 1/2019 | Chapman et al. |
| 2019/0107894 | A1 | 4/2019 | Hebbalaguppe et al. |
| 2019/0146578 | A1 | 5/2019 | Ikuta et al. |
| 2020/0129850 | A1* | 4/2020 | Ohashi ................... G06F 3/011 |

FOREIGN PATENT DOCUMENTS

| | | |
|---|---|---|
| CN | 103797441 A | 5/2014 |
| CN | 106708412 A | 5/2017 |

OTHER PUBLICATIONS

United States Office Action, U.S. Appl. No. 16/020,158, dated Oct. 31, 2019, 14 pages.
The State Intellectual Property Office of People's Republic of China, Office Action, Chinese Patent Application No. 201910333823.9, dated Mar. 31, 2021, 12 pages.
United States Office Action, U.S. Appl. No. 16/296,111, dated Oct. 21, 2019, 34 pages.
United States Office Action, U.S. Appl. No. 16/296,111, dated Mar. 3, 2020, 26 pages.
United States Office Action, U.S. Appl. No. 16/296,111, dated Aug. 5, 2020, 20 pages.
United States Office Action, U.S. Appl. No. 16/296,111, dated Oct. 6, 2020, 20 pages.
United States Office Action, U.S. Appl. No. 16/296,111, dated Jan. 11, 2021, 20 pages.
United States Office Action, U.S. Appl. No. 16/296,111, dated Mar. 2, 2021, 22 pages.

\* cited by examiner

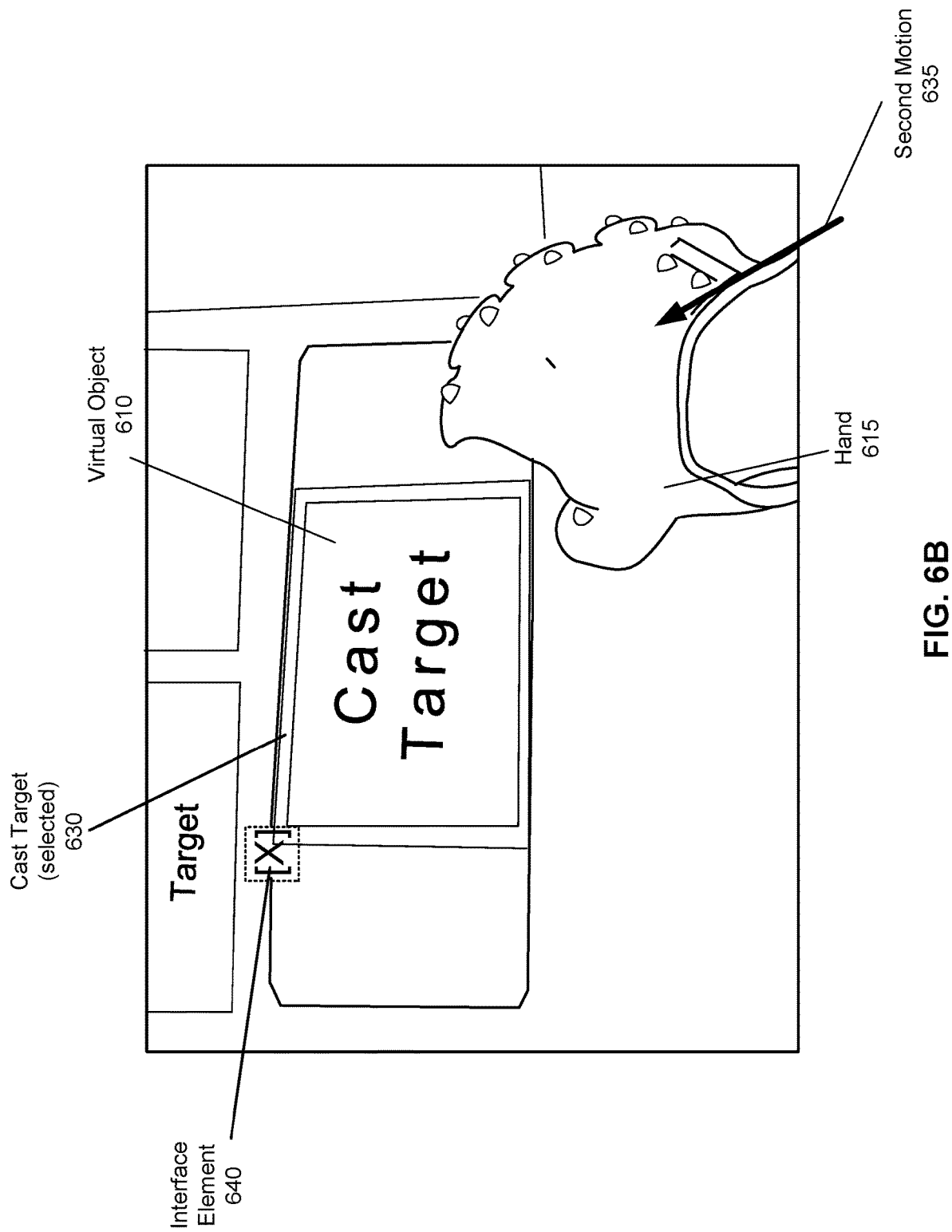

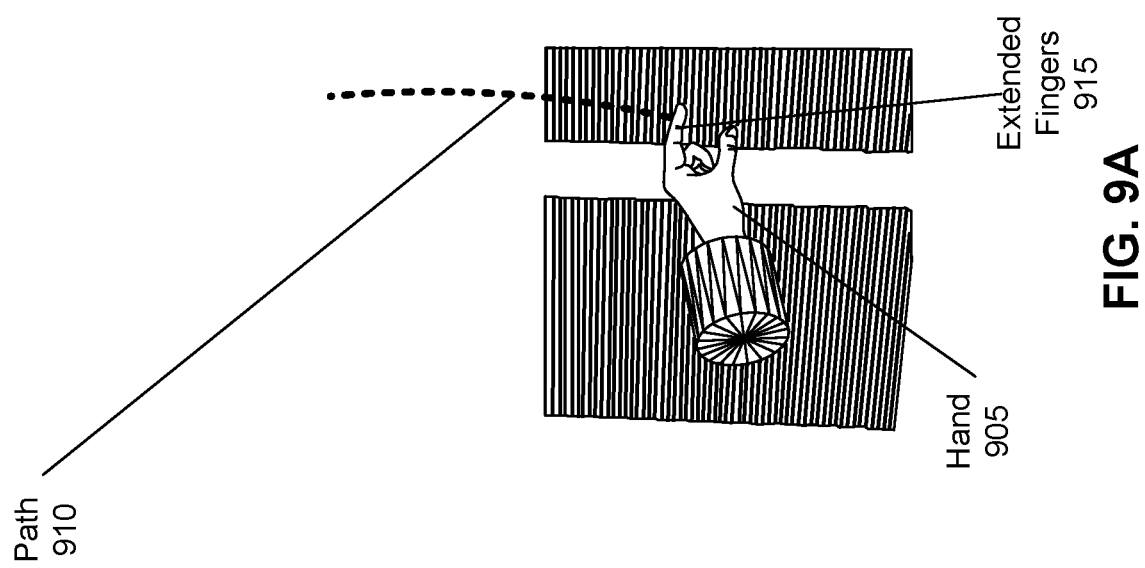

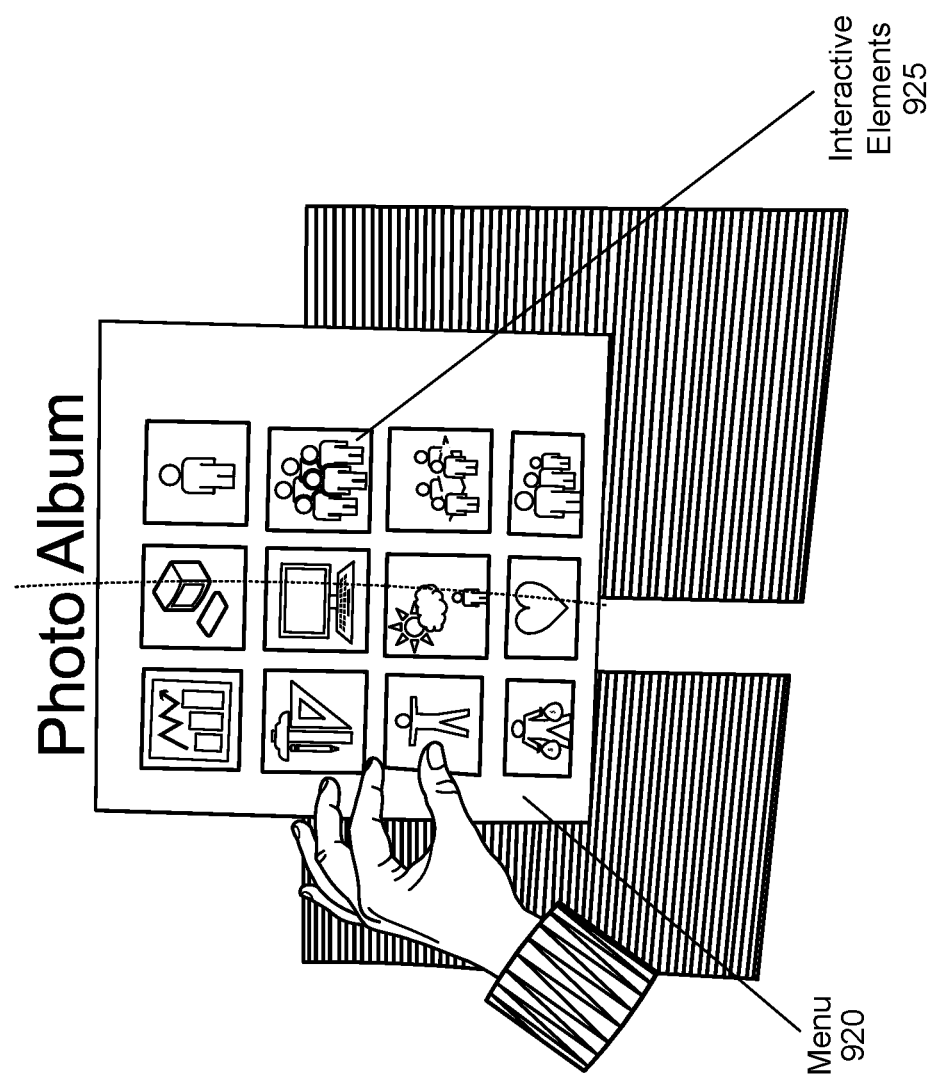

GESTURE-BASED CASTING AND MANIPULATION OF VIRTUAL CONTENT IN ARTIFICIAL-REALITY ENVIRONMENTS

CROSS REFERENCE TO RELATED APPLICATIONS

This application is a continuation of co-pending U.S. application Ser. No. 16/020,407, filed Jun. 27, 2018, which is incorporated by reference in its entirety.

BACKGROUND

The present disclosure generally relates to a gesture and eye tracking system, and specifically gesture-based casting and manipulation of virtual content in artificial-reality environments.

Augmented reality systems typically rely on wearable devices that have smaller form factors than classical virtual reality (VR) head mounted devices. The use of augmented reality systems presents new challenges in user interaction. Previous methods of user interaction with the local area may not be sufficient or optimal in an augmented reality system. For example, without the use of augmented reality, a user may need to interact physically with a device in a local area in order to enable a change in that device. However, with the user of augmented reality, both the device and the user experience may be upgraded to allow the user to cause a change in the device using methods other than simply physical interaction. However, such changes in user experience should be intuitive for the user to understand and should be technically feasible. Current method of user interaction in augmented reality are not readily intuitive and do not exploit the technical capabilities of an augmented reality system, and thus are not optimal for use.

SUMMARY

Embodiments are directed to a near eye display (NED) system for displaying artificial reality content to a user and to manipulate displayed content items based upon gestures performed by users of the NED system. A user of the NED system may perform a gesture simulating the throwing of an object to "cast" a content item to a target location in an artificial reality (AR) environment displayed by the NED system. The gesture may comprise a first portion in which the user's hand "grabs" or "pinches" a virtual object corresponding to the content item and moves backwards relative to their body, and a second portion in which the user's hand moves forwards relative to their body and releases the virtual object. The target location may be identified based upon a trajectory associated with the backwards motion of the first portion of the gesture.

In some embodiments, the system comprises a NED that includes an optical assembly having an electronic display that is configured to display images in accordance with display instructions and an imaging device configured to capture one or more images of a portions of a local area of the NED. The system further comprises a controller configured to determine a position of a hand of a user of the NED located within the local area using the captured one or more images, and based upon the determined hand positions, identify a first portion of a gesture performed by the hand of the user based upon one or more determined positions of the hand, the gesture corresponding to a predetermined sequence of one or more hand movements or hand positions and associated with a content item. The controller may further determine a position within the local area corresponding to an extension of a trajectory associated with at least the first portion of the identified gesture, and, in response to identifying a second portion of the gesture performed by the hand of the user based upon the one or more determined positions of the hand, update the display instructions to cause the electronic display to display a representation of the content item at the determined position.

BRIEF DESCRIPTION OF THE DRAWINGS

FIG. 6B illustrates the user performing a second part of the dartboard gesture to cast the virtual object onto the cast target, in accordance with one or more embodiments.

FIG. 9A illustrates the user performing a "slice" gesture to cause a menu to be displayed in the AR environment, in accordance with some embodiments.

FIG. 9B illustrates a menu containing interface virtual interface elements being displayed to the user following performance of the "slice" gesture, in accordance with some embodiments.

Figure 1:
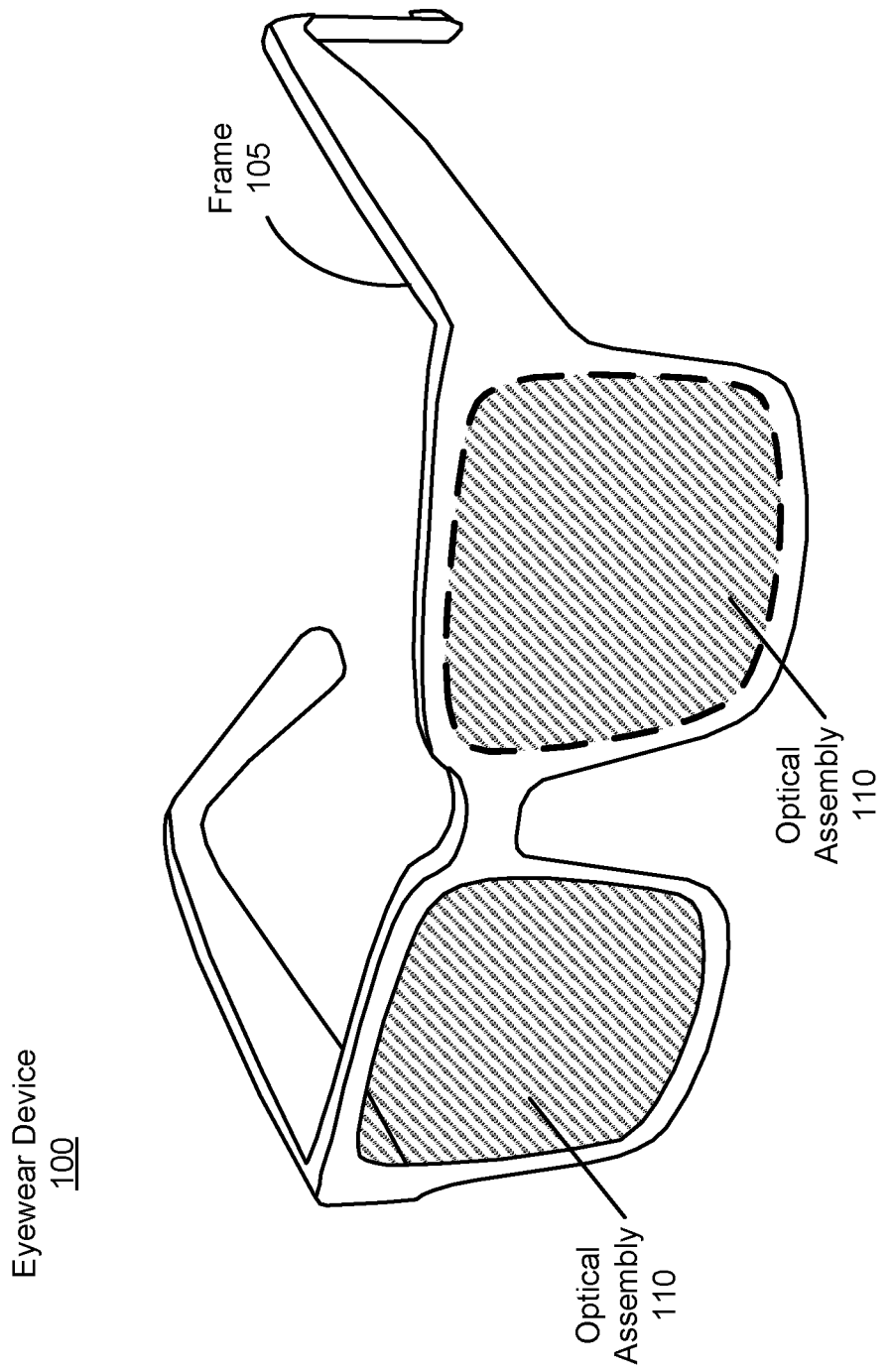
FIG. 1 is a diagram of an eyewear device, in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

In some embodiments, the near eye display (NED) system is configured to project artificial reality content to a user of the NED system. The NED system further includes a hand pose and gesture tracking system to determine hand positions and/or gestures performed by the user of the NED system and/or by other individuals with a local area of the NED system. The NED system is able to perform manipulations on displayed content items based upon the identified gestures. For example, in some embodiments, a user of the NED system may "cast" a content item to be displayed at a particular location in the AR environment (e.g., at a "cast target") by performing a gesture that simulates that throwing of a content item towards the desired cast target location. Such types of gestures may be easily understood by users, allowing the user to display various content items at predetermined virtual cast target locations or on surfaces of objects in a local area in an intuitive way. In some embodiments, the user may further manipulate a displayed content item by interacting with one or more virtual interface elements, such as buttons displayed in the AR environment. By moving their hands to locations associated with the displayed virtual interface elements, various operations can be performed on the displayed content items.

As used herein, the local area of the NED system may refer to an area surrounding a NED of the NED system. In some embodiments, the local area of the NED system may refer to a 360° area surrounding a location of a NED of the NED system that would be potentially visible to a user of the NED at the location. In addition, while the following discussion refers primarily to AR content, it is understood that in other embodiments the NED system may display to the user VR content in a VR environment.

Near Eye Display System Overview

FIG. 1 is a diagram of an eyewear device 100, in accordance with one or more embodiments. In some embodiments, the eyewear device 100 is a near eye display (NED) for presenting media to a user. Examples of media presented by the eyewear device 100 include one or more images, text, video, audio, or some combination thereof. In some embodiments, audio is presented via an external device (e.g., speakers and/or headphones) that receives audio information from the eyewear device 100, a console (not shown), or both, and presents audio data based on the audio information. The eyewear device 100 can be configured to operate as an artificial reality NED. In some embodiments, the eyewear device 100 may augment views of a physical, real-world environment with computer-generated elements (e.g., images, video, sound, etc.).

The eyewear device 100 shown in FIG. 1 includes a frame 105 and an optical assembly 110, which is surrounded by a rim 115. The optical element 110 is substantially transparent (e.g., allows a percentage transmittance) in the visible spectrum and may also include a substantially transparent electronic display. The frame 105 is coupled to one or more optical elements. In some embodiments, the frame 105 may represent a frame of eye-wear glasses. The optical assembly 110 may be configured for users to see content presented by the eyewear device 100. For example, the eyewear device 110 can include at least one waveguide display assembly (not shown) for directing one or more image light to an eye of the user. A waveguide display assembly includes, e.g., a waveguide display, a stacked waveguide display, a stacked waveguide and powered optical elements, a varifocal waveguide display, or some combination thereof. For example, the waveguide display may be monochromatic and include a single waveguide. In some embodiments, the waveguide display may be polychromatic and include a single waveguide. In yet other embodiments, the waveguide display is polychromatic and includes a stacked array of monochromatic waveguides that are each associated with a different band of light, i.e., are each sources are of different colors. A varifocal waveguide display is a display that can adjust a focal position of image light emitted from the waveguide display. In some embodiments, a waveguide display assembly may include a combination of one or more monochromatic waveguide displays (i.e., a monochromatic waveguide display or a stacked, polychromatic waveguide display) and a varifocal waveguide display. Waveguide displays are described in detail in U.S. patent application Ser. No. 15/495,373, incorporated herein by references in its entirety.

In some embodiments, the optical assembly 110 may include one or more lenses or other layers, such as lenses for filtering ultraviolet light (i.e., sunglass lenses), polarizing lenses, corrective or prescription lenses, safety lenses, 3D lenses, tinted lenses (e.g., yellow tinted glasses), reciprocal focal-plane lenses, or clear lenses that do not alter a user's view. The optical assembly 110 may include one or more additional layers or coatings, such as protective coatings, or coatings for providing any of the aforementioned lens functions. In some embodiments, the optical assembly 110 may include a combination of one or more waveguide display assemblies, one or more lenses, and/or one or more other layers or coatings.

Figure 2:
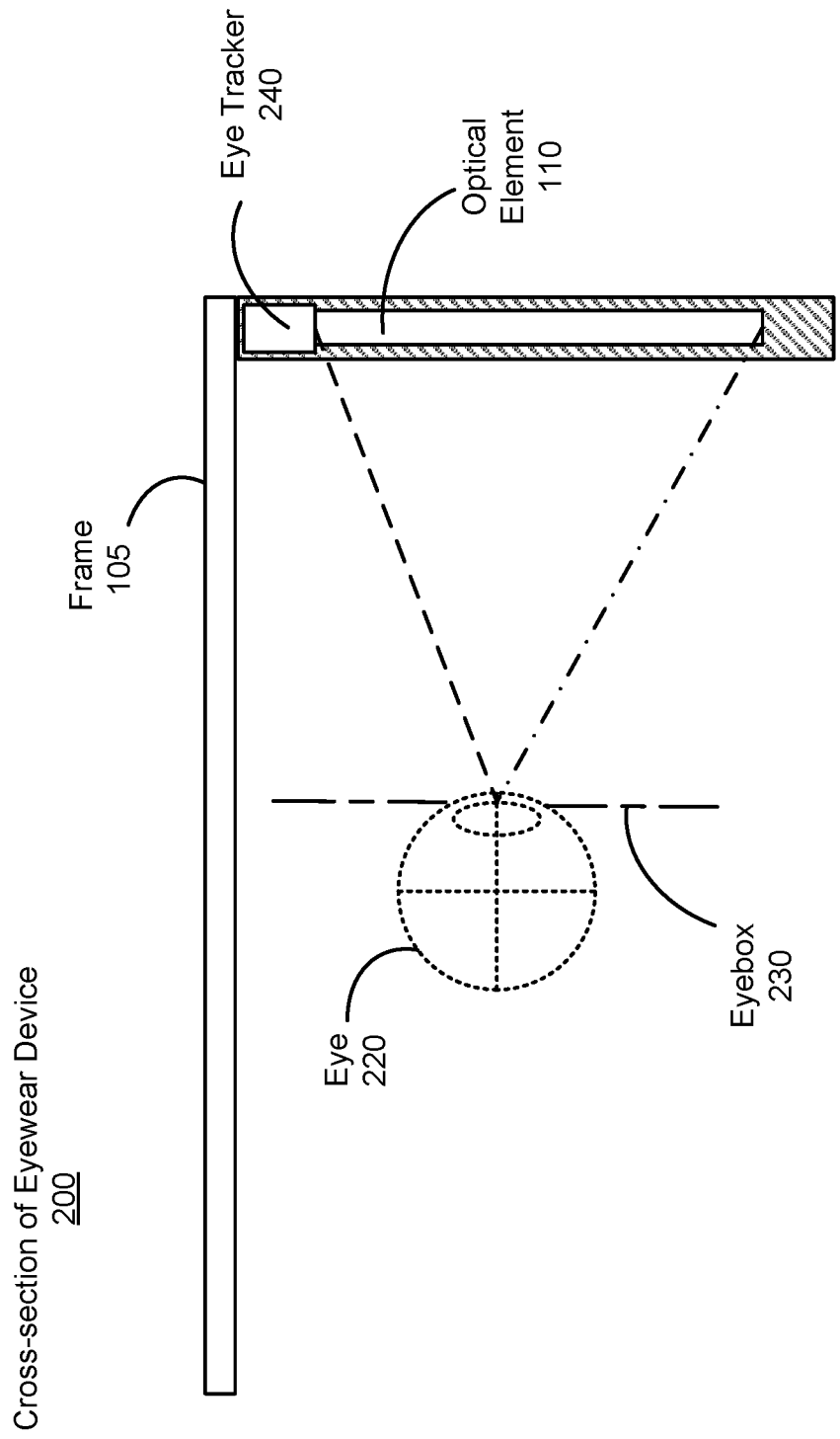
FIG. 2 is a cross section of the eyewear device of FIG. 1, in accordance with one or more embodiments.

FIG. 2 is a cross-section 200 of the eyewear device 100 illustrated in FIG. 1, in accordance with one or more embodiments. The optical assembly 110 is housed in the frame 105, which is shaded in the section surrounding the optical assembly 110. A user's eye 220 is shown, with dotted lines leading out of the pupil of the eye 220 and extending outward to show the eye's field of vision. An eyebox 230 shows a location where the eye 220 is positioned if the user wears the eyewear device 100. The eyewear device 100 includes an eye tracking system.

The eye tracking system determines eye tracking information for the user's eye 220. The determined eye tracking information may include information about a position of the user's eye 220 in an eyebox 230, e.g., information about an angle of an eye-gaze. An eyebox represents a three-dimensional volume at an output of a display in which the user's eye is located to receive image light.

In one embodiment, the eye tracking system includes one or more light sources to illuminate the eye at a particular wavelength or within a particular band of wavelengths (e.g., infrared). The light sources may be placed on the frame 105 such that the illumination from the light sources are directed to the user's eye (e.g., the location of the eyebox 230). The light sources may be any device capable of producing visible or infrared light, such as a light emitting diode. The illumination of the user's eye by the light sources may assist the eye tracker 240 in capturing images of the user's eye with more detail. The eye tracker 240 receives light that is emitted from the light sources and reflected off of the eye 220. The eye tracker 240 captures images of the user's eye, and the eye tracker 240 or an external controller can analyze the captured images to measure a point of gaze of the user (i.e., an eye position), motion of the eye 220 of the user (i.e., eye movement), or both. The eye tracker 240 may be a camera or other imaging device (e.g., a digital camera) located on the frame 105 at a position that is capable of capturing an unobstructed image of the user's eye 220 (or eyes).

In one embodiment, the eye tracking system determines depth information for the eye 220 based in part on locations of reflections of the light sources. Additional discussion regarding how the eye tracker 240 determines depth information is found in, e.g., U.S. application Ser. No. 15/456,383 and U.S. application Ser. No. 15/335,634, both of which are hereby incorporated by reference. In another embodiment, the eye tracker 240 does not include light sources, but instead captures images of the user's eye 220 without additional illumination.

The eye tracker 240 can be embedded in an upper portion of the frame 105, but may be located at any portion of the frame at which it can capture images of the user's eye. While only one eye tracker 240 is shown in FIG. 2, the eyewear device 100 may include multiple eye trackers 240 per eye 220.

By tracking the user's gaze, the eye tracker 240 can be used to determine where a user is looking at. This can be combined with a system, described below, which determines the gesture of the same user's hands. The combination of both a gaze and a particular gesture may be detected by the system and, in response, the system may perform some action based on the combination of gesture and gaze.

Figure 3:
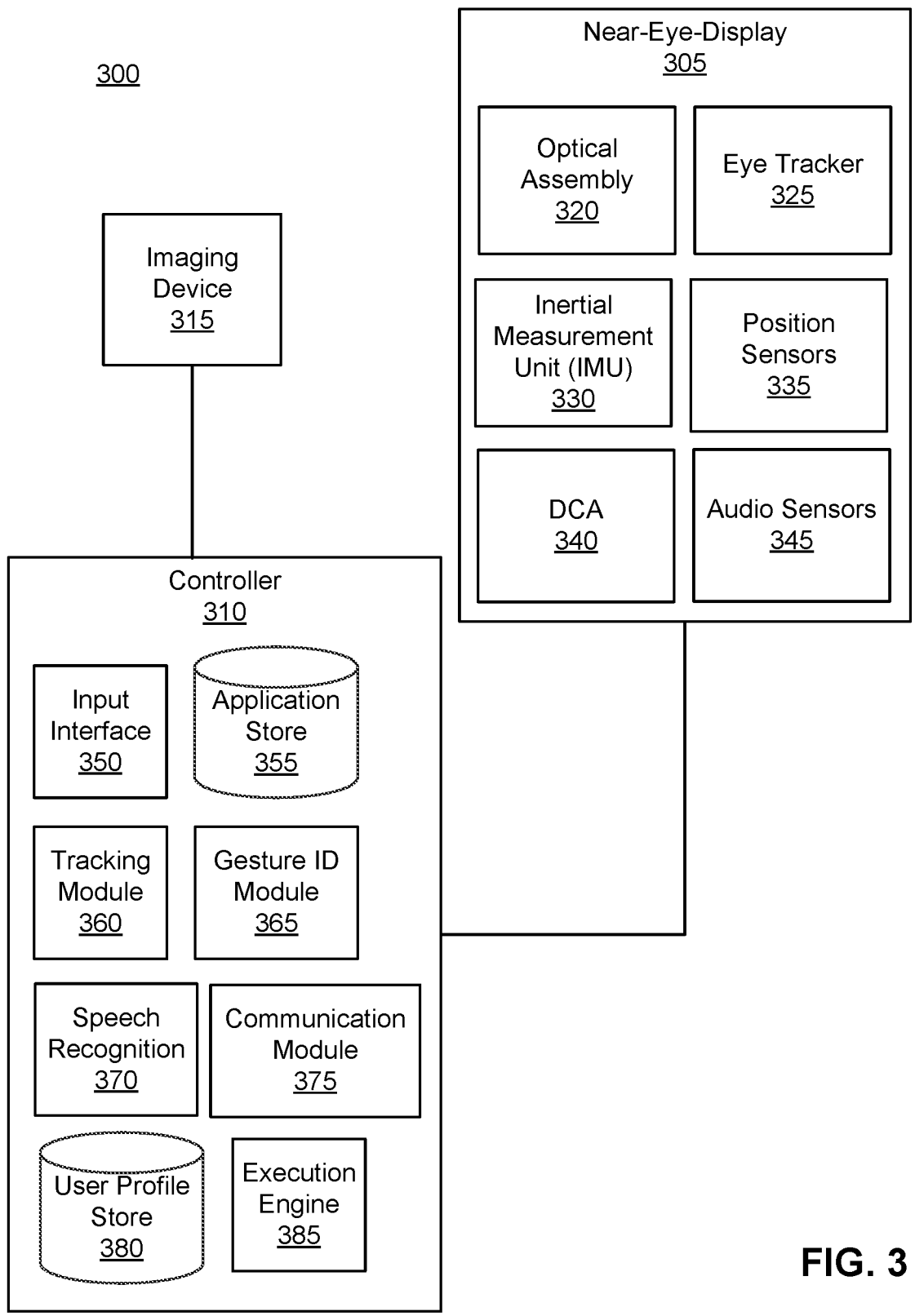
FIG. 3 is a block diagram of a NED system with an eye tracker, in accordance with one or more embodiments.

FIG. 3 is a block diagram of a NED system 300, in accordance with one or more embodiments-. The NED system 300 shown by FIG. 3 comprises a NED 305 coupled to a controller 310, with the controller 310 coupled to an imaging device 315. While FIG. 3 shows an example NED system 300 including one NED 305 and one imaging device 315, in other embodiments any number of these components may be included in the NED system 300. In alternative configurations, different and/or additional components may be included in the NED system 300. Similarly, functionality of one or more of the components can be distributed among the components in a different manner than is described here. For example, some or all of the functionality of the controller 310 may be contained within the NED 305. The NED system 300 may operate in an artificial reality environment.

The NED 305 presents content to a user. In some embodiments, the NED 305 is the eyewear device 100. Examples of content presented by the NED 305 include one or more images, video, audio, text, or some combination thereof. In some embodiments, audio is presented via an external device (e.g., speakers and/or headphones) that receives audio information from the NED 305, the controller 310, or both, and presents audio data based on the audio information. In some embodiments, the NED 305 operates as an artificial reality NED. In some embodiments, the NED 305 may augment views of a physical, real-world environment with computer-generated elements (e.g., images, video, sound, etc.).

The NED 305 includes an optical assembly 320 for each eye, an eye tracker 325, an inertial measurement unit (IMU) 330, one or more position sensors 335, and a depth camera array (DCA) 340. Some embodiments of the NED 305 have different components than those described here. Similarly, the functions can be distributed among other components in the NED system 300 in a different manner than is described here. In some embodiments, the optical assembly 320 displays images to the user in accordance with data received from the controller 310. In one embodiment, the optical assembly 320 is substantially transparent (e.g., by a degree of transmittance) to electromagnetic radiation in the visible spectrum.

The eye tracker 325 tracks a user's eye movement. The eye tracker 325 includes a camera for capturing images of the user's eye. An example of the placement of the eye tracker is shown in eye tracker 240 as described with respect to FIG. 2. Based on the detected eye movement, the eye tracker 325 may communicate with the controller 310 for further processing.

In some embodiments, the eye tracker 325 allows a user to interact with content presented to the user by the controller 310 based on the detected eye movement. Example interactions by the user with presented content include: selecting a portion of content presented by the controller 310 (e.g., selecting an object presented to the user), movement of a cursor or a pointer presented by the controller 310, navigating through content presented by the controller 310, presenting content to the user based on a gaze location of the user, or any other suitable interaction with content presented to the user.

In some embodiments, NED 305, alone or conjunction with the controller 310 or another device, can be configured to utilize the eye tracking information obtained from the eye tracker 325 for a variety of display and interaction applications. The various applications include, but are not limited to, providing user interfaces (e.g., gaze-based selection), attention estimation (e.g., for user safety), gaze-contingent display modes, metric scaling for depth and parallax correction, etc. In some embodiments, based on information about position and orientation of the user's eye received from the eye tracking unit, a controller (e.g., the controller 310) determines resolution of the content provided to the NED 305 for presentation to the user on the optical assembly 320. The optical assembly 320 may provide the content in a foveal region of the user's gaze (and may provide it at a higher quality or resolution at this region).

In another embodiment, the eye tracking information obtained from the eye tracker 325 may be used to determine the location of the user's gaze in the local area. This may be used in conjunction with a gesture detection system to allow the system to detect various combinations of user gesture and gazes. As described in further detail below, different combinations of user gaze and gestures, upon detection by the controller 310, may cause the controller 310 to transmit further instructions to devices or other objects in the local area, or execute additional instructions in response to these different combinations.

In some embodiments, the eye tracker 325 includes a light source that is used to project light onto a user's eye or a portion of the user's eye. The light source is a source of the light that is reflected off of the eye and captured by the eye tracker 325.

The IMU 330 is an electronic device that generates IMU tracking data based on measurement signals received from one or more of the position sensors 335. A position sensor 335 generates one or more measurement signals in response to motion of the NED 305. Examples of position sensors 335 include: one or more accelerometers, one or more gyroscopes, one or more magnetometers, another suitable type of sensor that detects motion, a type of sensor used for error correction of the IMU 330, or some combination thereof.

The position sensors 335 may be located external to the IMU 330, internal to the IMU 330, or some combination thereof.

Based on the one or more measurement signals from one or more position sensors 335, the IMU 330 generates IMU tracking data indicating an estimated position of the NED 305 relative to an initial position of the NED 305. For example, the position sensors 335 include multiple accelerometers to measure translational motion (forward/back, up/down, left/right) and multiple gyroscopes to measure rotational motion (e.g., pitch, yaw, and roll). In some embodiments, the IMU 330 rapidly samples the measurement signals and calculates the estimated position of the NED 305 from the sampled data. For example, the IMU 330 integrates the measurement signals received from the accelerometers over time to estimate a velocity vector and integrates the velocity vector over time to determine an estimated position of a reference point on the NED 305. Alternatively, the IMU 330 provides the sampled measurement signals to the controller 310, which determines the IMU tracking data. The reference point is a point that may be used to describe the position of the NED 305. While the reference point may generally be defined as a point in space; however, in practice the reference point is defined as a point within the NED 305 (e.g., a center of the IMU 330).

The depth camera assembly (DCA) 340 captures data describing depth information of a local area surrounding some or all of the NED 305. The data that may be captured may include information captured from a structured light pattern projected on the local area, stereo images, time of flight data, or depth information captured using other depth measurement techniques. The DCA 340 can compute the depth information using the data (e.g., based on a captured portion of a structured light pattern), or the DCA 340 can send this information to another device such as the controller 710 that can determine the depth information using the data from the DCA 340.

The DCA 340 includes a light generator, an imaging device and a controller. The light generator of the DCA 340 is configured to illuminate the local area with illumination light in accordance with emission instructions. The imaging device of the DCA 340 includes a lens assembly, and a detector. The lens assembly is configured to receive light from a local area surrounding the imaging device and to direct at least a portion of the received light to the detector. The controller of the DCA 340 generates the emission instructions and provides the emission instructions to the light generator. The controller of the DCA 340 further determines depth information for the one or more objects based in part on the captured one or more images.

The imaging device 315 may be used to capture a representation of the user's hands over time for use in tracking the user's hands (e.g., by capturing multiple images per second of the user's hand). To achieve a more accurate capture, the imaging device 315 may be able to capture depth data of the local area or environment. This may be achieved by various means, such as by the use of computer vision algorithms that generate 3D data via detection of movement in the scene, by the emission of a grid pattern (e.g., via emission of an infrared laser grid) and detection of depth from the variations in the reflection from the grid pattern, from computation of time-of-flight of reflected radiation (e.g., emitted infrared radiation that is reflected), and/or from the user of multiple cameras (e.g., binocular vision, stereophotogrammetry). The imaging device 315 may be positioned to capture a large spatial area, such that all hand movements within the spatial area are captured. In one embodiment, more than one imaging device 315 is used to capture images of the user's hands. As described in further detail below, the captured images of the user's hands may be used to identify various gestures for the user. Upon detecting these gestures in combination with the satisfaction of other conditions, a controller may execute certain associated actions.

In another embodiment, the imaging device 315 may also capture images of one or more objects in the local area, and in particular the area encompassing the field of view of a user wearing an eyewear device that includes the NED 305. The imaging device 315 may also capture depth data of these one or more objects in the local area according to any of the methods described above.

Although the imaging device 315 is illustrated in FIG. 3 as being separate from the NED 305, in some embodiments the imaging device is attached to the NED 305, e.g., attached to the frame 105, and may also be part of the DCA 340.

The imaging device 315 may include one or more cameras, imaging sensors, one or more video cameras, any other device capable of capturing images, or some combination thereof. Additionally, the imaging device 315 may include one or more hardware and software filters (e.g., used to increase signal to noise ratio). Image tracking data is communicated from the imaging device 315 to the controller 310, and the imaging device 315 receives one or more calibration parameters from the controller 310 to adjust one or more imaging parameters (e.g., focal length, focus, frame rate, ISO, sensor temperature, shutter speed, aperture, etc.).

In some embodiments, the NED 305 may further comprise audio sensors 345. The audio sensors 345 may comprise a microphone or other type of sensor configured to capture audio data from the local area surrounding the NED 305. The audio data may include speech by the user of the NED system 300 or by other individuals within the local area, other types of noises within the local area, and/or the like. In some embodiments, the audio sensors 345 may be located separately from the NED 305.

The controller 310 provides content to the NED 305 for presentation to the user in accordance with information received from the imaging device 315 or the NED 305. In the example shown in FIG. 3, the controller 310 includes an input interface 350, an application store 355, a tracking module 360, a gesture identification (ID) module 365, a speech recognition module 370, and a communication module 375, a user profile store 380, and an execution engine 385. Some embodiments of the controller 310 have different modules than those described herein. Similarly, the functions further described below may be distributed among components of the controller 310 in a different manner than is described herein. In one embodiment, the controller 310 is a component within the NED 305.

In one embodiment, the controller 310 includes an input interface 350 to receive additional external input. These external inputs may be action requests. An action request is a request to perform a particular action. For example, an action request may be to start or end an application or to perform a particular action within the application. The input interface 350 may receive input from one or more input devices. Example input devices include: a keyboard, a mouse, a game controller, or any other suitable device for receiving action requests. In another embodiment, the input interface 350 receives input from one or more radio frequency (RF) signal receivers. These may be used to receive radio signals from RF identifiers in the local area, and in some cases to determine a distance (based on signal strength) and position (based on triangulation or other method) of the RF identifier. After receiving an action request, the controller 310 performs an action corresponding to the action request. In some embodiments, the action performed by the controller 310 may include haptic feedback, which may be transmitted via the input interface 350 to haptic feedback devices. In some embodiments, the input interface 350 may comprise a separate component in communication with the controller 310, such as a mobile device able to communicate wirelessly with the controller 310.

The application store 355 stores one or more applications for execution by the controller 310. An application is a group of instructions, that when executed by a processor, generates content for presentation to the user. Content generated by an application may be in response to inputs received from the user via movement of the NED 305, the input interface 350, the eye tracker 325, and/or the audio sensors 345. Examples of applications include: gaming applications, conferencing applications, video playback application, or other suitable applications. In some embodiments, the application store 355 may further store content generated by the one or more applications. In other embodiments, generated content may be stored in a separate content data store (not shown) implemented as part of the controller 310 or as an external device in communication with the controller 310.

The tracking module 360 tracks movements of the NED 305 and the hands of the user wearing the NED 305. To track the movement of the NED 305, the tracking module 360 uses information from the DCA 340, the imaging device 315, the one or more position sensors 335, the IMU 330, or some combination thereof. For example, the tracking module 360 determines a position of a reference point of the NED 305 in a mapping of a local area based on information from the NED 305. The tracking module 360 may also determine positions of the reference point of the NED 305 using data indicating a position of the NED 305 from the IMU 330. Additionally, in some embodiments, the tracking module 360 may use portions of data indicating a position or the NED 305 from the IMU 330 as well as representations of the local area from the DCA 340 to predict a future location of the NED 305. The tracking module 360 may provide the estimated or predicted future position of the NED 305 to the execution engine 385.

As noted, the tracking module 360 also tracks the user's hands, and the digits of the user's hands, in order to recognize various poses for the user's hand. Each pose indicates a position of a user's hand. By detecting a combination of multiple poses over time, the tracking module 360 is able to determine a gesture for the user's hand. These gestures may in turn translate into various inputs to the system. For example, a movement using a single digit in one direction may translate into a button press input in the system.

In one embodiment, the tracking module 360 uses a deep learning model to determine the poses of the user's hands. The deep learning model may be a neural network, such as a convolutional neural network, or a residual neural network. The neural network may take as input feature data extracted from raw data from the imaging device 315 of the hand, e.g., depth information of the user's hand, or data regarding the location of locators on any input device worn on the user's hands. The neural network may output the most likely pose that the user's hands are in. Alternatively, the neural network may output an indication of the most likely positions of the joints of the user's hands. The joints are positions of the user's hand, and may correspond to the actual physical joints in the user's hand, as well as other points on the user's hand that may be needed to sufficiently reproduce the motion of the user's hand in a simulation.

If the neural network outputs the positions of joints, the tracking module 360 additionally converts the joint data into a pose, e.g., using inverse kinematics principles. For example, the position of various joints of a user's hand, along with the natural and known restrictions (e.g., angular, length, etc.) of joint and bone positions of the user's hand allow the tracking module 360 to use inverse kinematics to determine a most likely pose of the user's hand based on the joint information. The pose data may also include an approximate structure of the user's hand, e.g., in the form of a skeleton, point mesh, or other format.

The neural network is trained using training data. In one embodiment, the training data is generated from a multiple camera array, such as multiple imaging devices 315, that captures hand movements in different poses with different hands from different users, and/or the locators on input devices worn by the different hands. The ground truth for this training data indicates joint positions and/or poses for the hands, and may be generated using human verification.

In one embodiment, the tracking module 360 is used to track movement of the digits of the user's hands and the hands themselves in order to recognize various gestures and poses for the user's hand. Each pose indicates a position of a user's hand. By detecting a combination of multiple poses over time, the tracking module 360 is able to determine a gesture for the user's hand. These gestures may in turn translate into various inputs to the system. For example, a movement using a single digit in one direction may translate into a button press input in the system.

An additional neural network may be used by the tracking module 360 to determine a gesture from a particular series of poses. Such a neural network may be similarly trained, using as input data computed poses (or joints) and with output data indicating the most likely gesture. Other methods may be used by the tracking module 360 to determine the gesture from the pose, such as a measurement of the distances and positions between the digits of the hand and the positions of a series of poses in 3D space. If these distances and positions of each pose fall within certain thresholds, the tracking module 360 may indicate that a particular gesture is present.

Using such a method, the tracking module 360 is able to determine the likely poses of a user's hands, and with the determination of the poses, the tracking module 360 may be able to match the movement of the user's hands with predefined gestures. These gestures may be used to indicate various actions in an augmented reality environment.

The gesture ID module 365 identifies the gestures of a user's hand based on the poses determined by the tracking module 360. The gesture ID module 365 may utilize a neural network to determine a gesture from a particular series of poses. Such a neural network may be trained using as input data computed poses (or joints) and with output data indicating the most likely gesture. Other methods may be used by the gesture ID module 365 to determine the gesture from the pose, such as a measurement of the distances and positions between the digits of the hand and the positions of a series of poses in 3D space. If these distances and positions of each pose fall within certain thresholds, the gesture ID module 365 may indicate that a particular gesture is present. In one embodiment, the gesture ID module 365 identifies a pinch gesture of the user. A pinch gesture is formed when distal ends of a user's index finger and thumb on one of the user's hands move within a threshold distance of each other. When the series of poses which form this gesture are recognized by the gesture ID module 365, the gesture ID module 365 determines that a pinch gesture is formed. As described in further detail below, the controller 310 may execute certain actions when an identified gesture is detected along with other conditions, such as a particular gaze direction of the user's eyes as determined by the eye tracker 325, audio data captured by the audio sensors 345, and/or the like.

Using such a method, the tracking module 360 is able to determine the likely poses of a user's hands, and with the determination of the poses, the gesture ID module 365 matches the movement of the user's hands with predefined gestures. These gestures may be used to indicate various actions in an artificial reality environment.

Additional details regarding the tracking and determination of hand positions using imaging devices and input devices are described in U.S. application Ser. No. 15/288,453, filed Oct. 7, 2016, and U.S. application Ser. No. 15/668,418, filed Aug. 3, 2017, both of which are incorporated by reference in their entirety.

In another embodiment, the tracking module 360 is also configured to recognize objects in images captured by the imaging device 315. To perform this function, the tracking module 360 may first be trained on a large corpus of labeled object data, or be coupled to a pre-trained image recognition system, which may be on an online system. In the former case, the tracking module 360 includes a machine learning model (e.g., a convolutional neural network) and is trained on a standard image-object library (e.g., ImageNet), or on a large set of user-provided images from an online system. These user-provided images may include a large number of images of objects, as well as a labeling of these objects (e.g., using captions, etc.). Alternatively, in the latter case, the online system itself already includes a machine learning model trained on the aforementioned user-provided and labeled images. For example, the online system may already have an object recognition system which receives images and outputs a label for each. The model on the online system is used instead of any model on the controller 310 to perform the object recognition in this case. After recognizing an object, the tracking module 360 may be able to track the location of the object in the field of view provided by the NED 305 to the user. This may be achieved by continuously recognizing users in each frame captured by the imaging device 315. Once an object is recognized, the tracking module 360 can indicate the location of the object, and the boundaries of the object (e.g., the pixels corresponding to the recognized object) in the captured image. This can be translated to a location of the object in the user's field of view provided by the NED 305 through the optical assembly 310.

In some embodiments, the controller 310 comprises a speech recognition module 370 configured to transcribe audio data received via one or more audio sensors 345. In some embodiments, the audio sensors 345 are able to record audio data corresponding to speech by the user of the NED system 300 or other individuals within the local area of the NED 305. The speech recognition module 370 uses one or more audio transcription algorithms to parse to received audio data and transcribe a transcription of the detected speech. In some embodiments, the transcription may be used to create or manipulate one or more content items, to display one or more virtual objects to the user of the NED 305, mapped to an executable command, and/or the like.

In some embodiments, the controller 310 comprises a communication module 375 for communication with other systems, such as other NED systems, allowing the NED system 300 to transmit and receive commands and/or content items with other systems through the communication module 375. For example, different users of different NED systems may be able to access and view different content items in their respective AR environments. The communication module 375 may allow for the first user of a first NED system 300 to transmit and share one or more content items with a second user of a second NED system (which may have a structure similar to that of the first NED system 300), allowing both users to view the same content. In some embodiments, the communication module 375 may transmit one or more commands to an external system based upon inputs received from a user (e.g., through the input interface 350, or through the performance of one or more gestures).

In some embodiments, the NED system 300 may be used by a plurality of different users. Each user of the NED system 300 may be associated with an account or user profile stored in a user profile store 385. The user profile store 385 stores user information corresponding to each user, such as user attributes, user preferences, content associated with the user, and/or the like. In some embodiments, the user profile store 385 stores permission information indicating content that may be viewed and/or modified by different users of the NED system 300. As such, different users of the NED system 300 may be able to view different content through the NED 305. For example, a first user of the NED system 300 may be able to view through an AR environment projected by the NED 305 virtual objects depicting images associated with a user profile of the first user, which would not be visible to a second user of the NED system 300 associated with a different user profile.

In some embodiments, instead of user profile information being stored in the user profile store 380, the NED system 300 may, using the communication module 375, access an online system such as a social network platform in order to access user profile information associated with different users. In some embodiments, the NED system 300 accesses the social network platform to identify social network connections between different users of the NED system 300. Based upon the social network connections, the NED system 300 may determine which types of content can be displayed to which users (e.g., content associated with a first user may be viewed by a second user having a "friend" relationship with the first user, but not by a third user having no social network connection to the first user).

In some embodiments, different users may concurrently use the NED system 300 via different NEDs 305. For example, the controller 310 may transmit display instructions to a first NED 305 to display a first AR environment to a first user, and to a second NED to display a second AR environment to a second user. As such, each of the first and second users may be able to view different virtual objects through their respective AR environments. In some embodiments, the NED system 300 may cause different content to be displayed in the first or second AR environments in response to detecting one or more predetermined gestures performed by the first and/or second users. For example, as discussed in greater detail below, the NED system 300 may, in response to detecting a particular gesture by the first user, display to the second user a visual flair emphasizing the gesture in the second AR environment. In some embodiments, the NED system 300 may, in response to a gesture by the first user, change the permissions of a content item such that the content item can be viewed by the second user in the second AR environment.

In one embodiment, the controller 310 additionally includes an execution engine 385. The execution engine 385 executes applications within the NED system 300 and receives position information, acceleration information, velocity information, predicted future positions, or some combination thereof, from the NED 305, input interface 350, and/or the tracking module 360. Based on the received information, the execution engine 385 determines content to provide to the NED 305 for presentation/display to the user. For example, if the received information indicates that the user has looked to the left, the execution engine 385 generates content for the NED 305 that is based off the user's movement in the artificial reality environment. Similarly, if information received from the tracking module 360 indicates the user's hand makes a particular gesture, the execution engine 385 generates content based on the identified gesture. In addition, if the information received from the NED 305 indicates a particular gaze of the user, the execution engine 385 may generate content based on that gaze. This content may include an update to the optical assembly 320 in the NED 305, such that content displayed to a user wearing the NED 305 changes.

The execution engine 385 may also perform an action within an application executing on the controller 310 in response to an action request received from the input interface 350 and provides feedback to the user that the action was performed. The provided feedback may be visual or audible feedback via the NED 305. For example, the execution engine 385 may receive an action from the input interface 350 to open an application, and in response, the execution engine 385 opens the application and presents content from the application to the user via the NED 305.

In one embodiment, the execution engine 370 determines the current pose of the user's hand based on raw joint data received from the tracking module 360. In another embodiment, the execution engine 370 detects the gestures of the user's hand based on the pose data. The methods in which the execution engine 370 determines poses and gestures are similar to the methods described above for the tracking module 360. In one embodiment, the execution engine 370 performs object recognition similar to the method described above for the tracking module 360.

In addition to determining the current pose of the user's hand(s), the execution engine 385 may also provide output to the optical assembly 320 in accordance with a set of display instructions (e.g., pixel data, vector data, etc.). This output to the electronic display of the optical assembly 320 may include a virtual recreation (using computer graphics) of the user's hands, as well as other objects (virtual or otherwise), such as outlines of objects in the local area, text, graphics, other elements that coincide with objects within a field of view of a user wearing the NED 305, and so on. In some embodiments, the execution engine 385 provides output to the optical assembly 320 to cause the optical assembly 320 to display one or more virtual objects to be displayed to user at locations corresponding to the position of the user's hands. For example, if a user performs a "pinch" gesture with their hand, the execution engine 385 may provide instructions to the optical assembly 320 to display a particular virtual object such that a corner of the virtual object remains between the thumb and index finger of the user's hand, even as the user moves their hand.

The execution engine 385 may receive from the tracking module 360 an indication of a tracked object. The tracking module 360 may be previously configured to recognize and track certain objects. These objects may provide some control functionality or may be associated with additional details or information. Upon receiving the indication of the tracked object, the execution engine 385 transmits display instructions to the optical assembly 320 to cause the optical assembly 320 to display various elements, such as contextual menus, control user interface elements, informational menus, and so on, to the user. These displayed elements may be shown at a threshold distance from the tracked object as viewed by the user in the augmented or artificial reality environment presented by the NED 305.

In one embodiment, the execution engine 385 may first recognize the recognizable objects in a local area as captured by the imaging device 315. An object may be recognized according to a pre-programmed recognition pattern. A recognition pattern may include a unique identifier of the object as generated by the object recognition system of the tracking module 360. The recognition pattern may include the values of the output parameters generated by the object recognition system that caused the tracking module 360 to recognize the object (e.g., the confidence weights generated by the object recognition system). In another embodiment, the recognition pattern may be some other fingerprint, pattern, identifier, or other data that is able to be used to recognize the object again under different orientation and lighting. When the object is encountered, the object recognition system of the tracking module 360 may generate another identifier based on the characteristics of the object. This identifier is compared to the stored recognition pattern for the object, and if a match occurs, the object is recognized as the object associated with the stored recognition pattern.

Additionally, in some embodiments, the execution engine 385 further utilizes additional tracking indicators in the local area to assist in the recognition of objects. As noted above, the objects in the environment may have RF identifiers, which may be received by the input interface 350 via one or more RF receivers. The execution engine 385, via the signals received from the RF receivers, and through various signal source locating mechanisms (e.g., triangulation, time-of-flight, Doppler shift), may determine the position of an object that has an RF identifier using the RF signals from the object. This information may be used to augment (e.g., adjust for error) the image based object recognition system, or may be used in place of the image based object recognition system (e.g., in the case where the image based object recognition system fails or has high error/uncertainty). Other tracking indicators, such as retroreflectors (which may respond to a non-visible light signal from the eyewear device 100), high contrast locators, QR codes, barcodes, identifying image patterns, and so on, may also be used by the execution engine 385 to assist in recognizing the object, and this information may be stored in the recognition pattern for the object. Upon recognition of the enhanced object, the execution engine 385 may update the display instructions of the optical assembly 320 to present additional simulated or virtual elements related to the enhanced object in the artificial reality environment presented by the NED system 300. The virtual elements may be positioned in the artificial reality environment at a threshold distance (e.g., 1 cm) of the enhanced object. The execution engine 385 may compute the position of the enhanced object in 3D space and project the virtual elements on the display such that they appear to be within the 3D space and near to the enhanced object (within the threshold distance). Upon detection of movement of the enhanced object, the execution engine 385 may submit updated display instructions to move the virtual elements based on the movement of the enhanced object.

In some embodiments, the one or more tracked objects may correspond to other individuals within the local area, such as users of other NEDs. The execution engine 385 may, as part of tracking the other individuals, identify gestures performed by the other individuals, and update the display instructions of the optical assembly 320 based upon the identified gestures. For example, the execution engine 385 may instruct the optical assembly 320 to display visual flair corresponding to the identified gestures. In some embodiments where the other individuals are users of other NED systems, the execution engine 385 may transmit or receive content with the other NED systems, based upon identified gestures performed by the user of the NED system 300 or by the users of the other NED systems.

Figure 4:
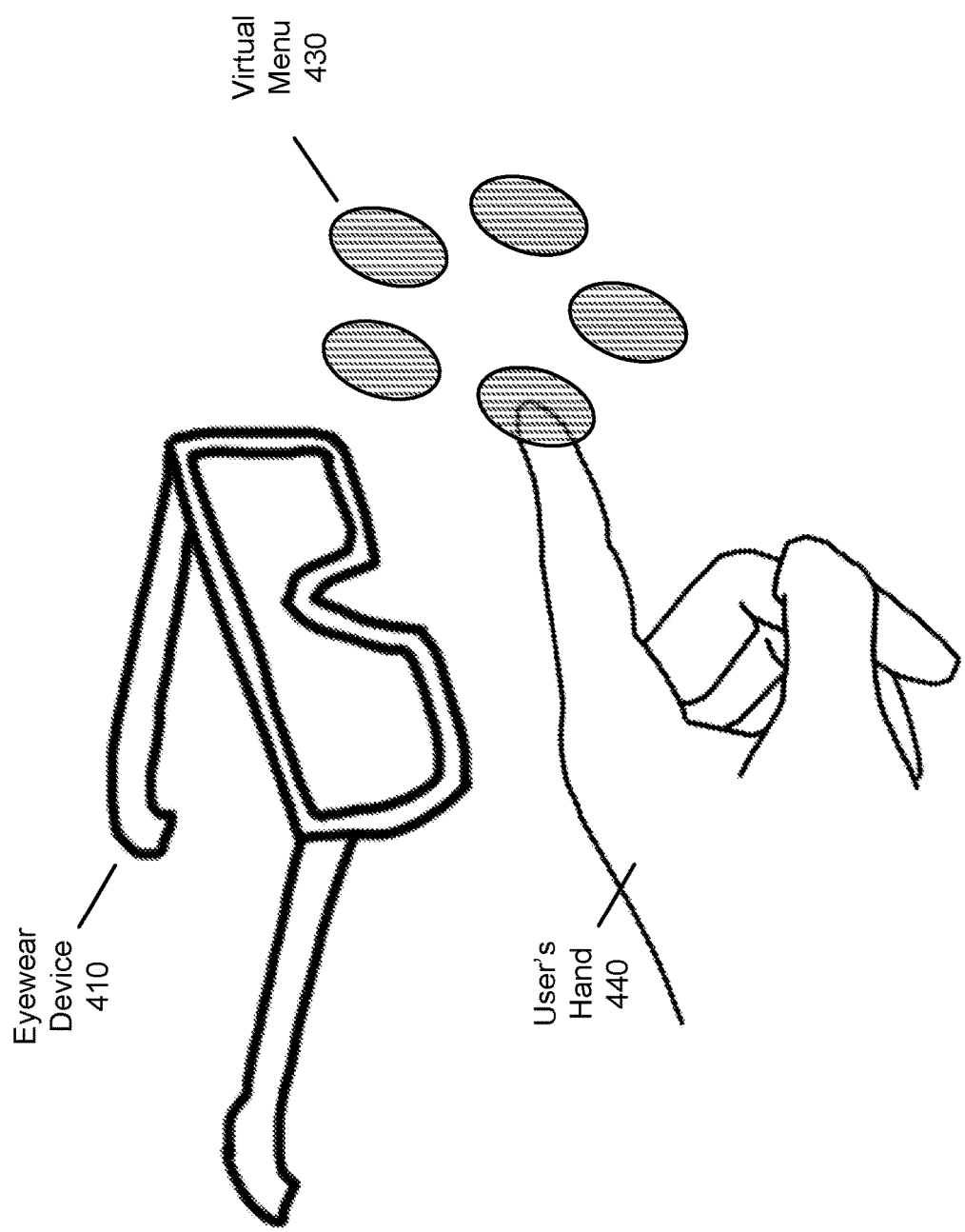
FIG. 4 illustrates an example of a virtual menu that may be displayed to a user by an eyewear device, in accordance with one or more embodiments.
Figure 5:
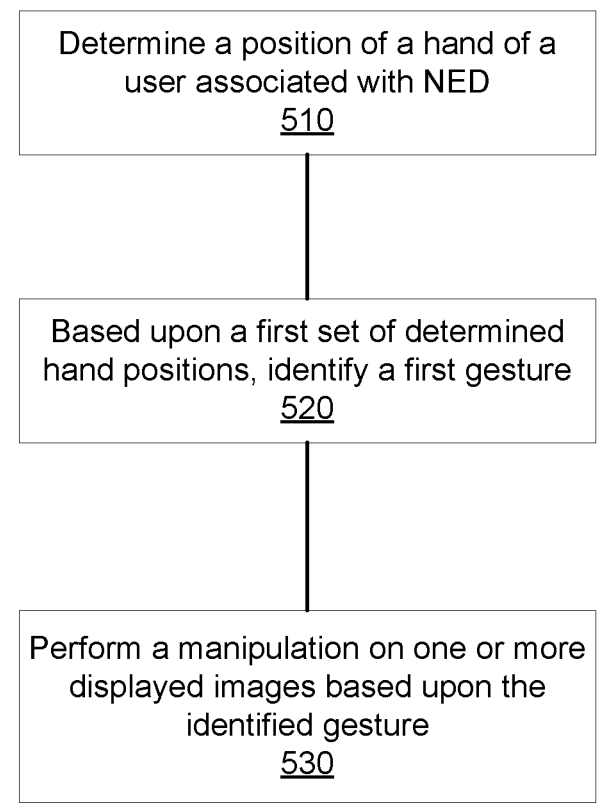
FIG. 5 is a flowchart of an example process for manipulating an artificial reality environment based upon identified gestures, in accordance with one or more embodiments.
Figure 6A:
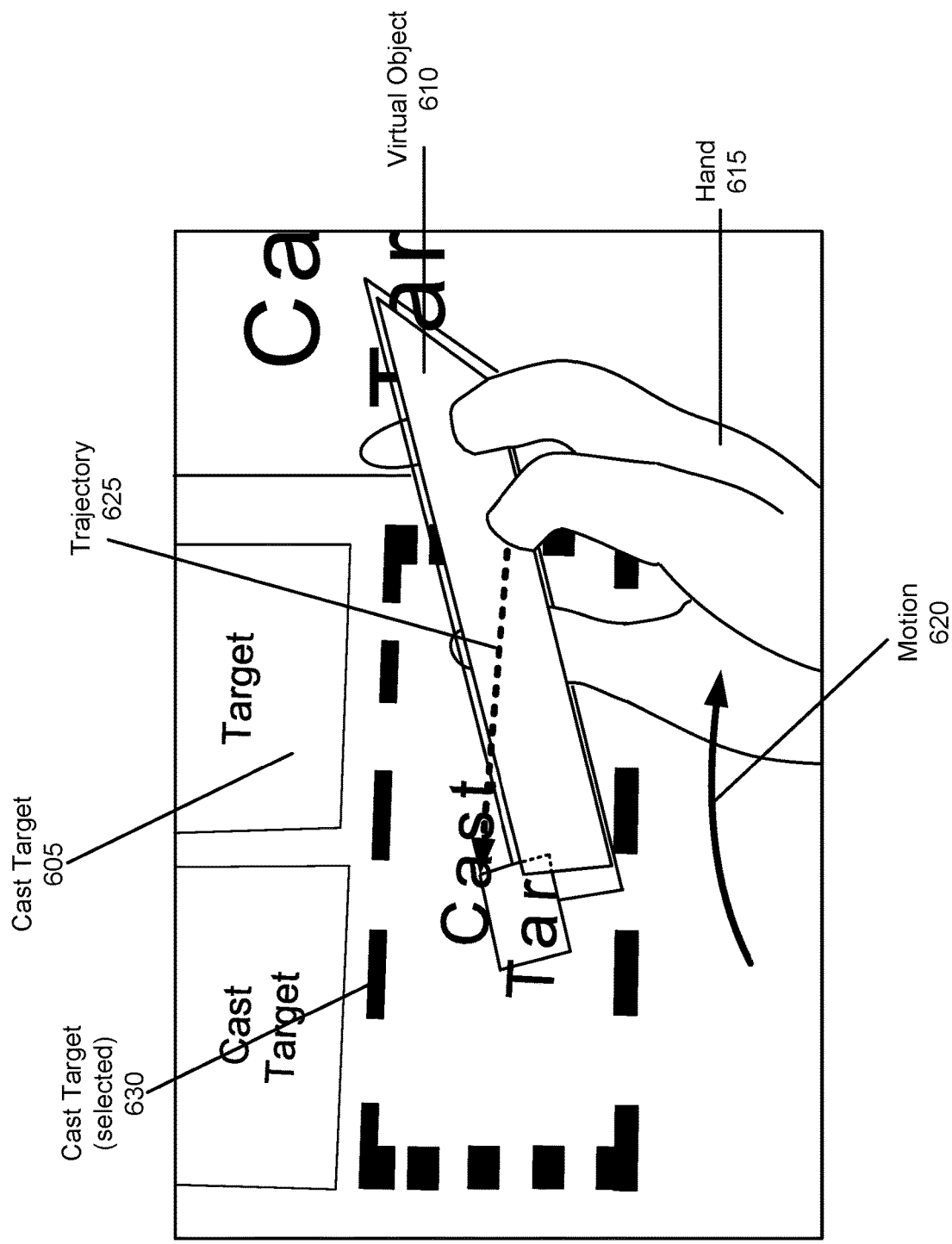
FIG. 6A illustrates the user performing a first part of the dartboard gesture to prepare to cast a virtual object onto a cast target, in accordance with one or more embodiments.
Figure 7:
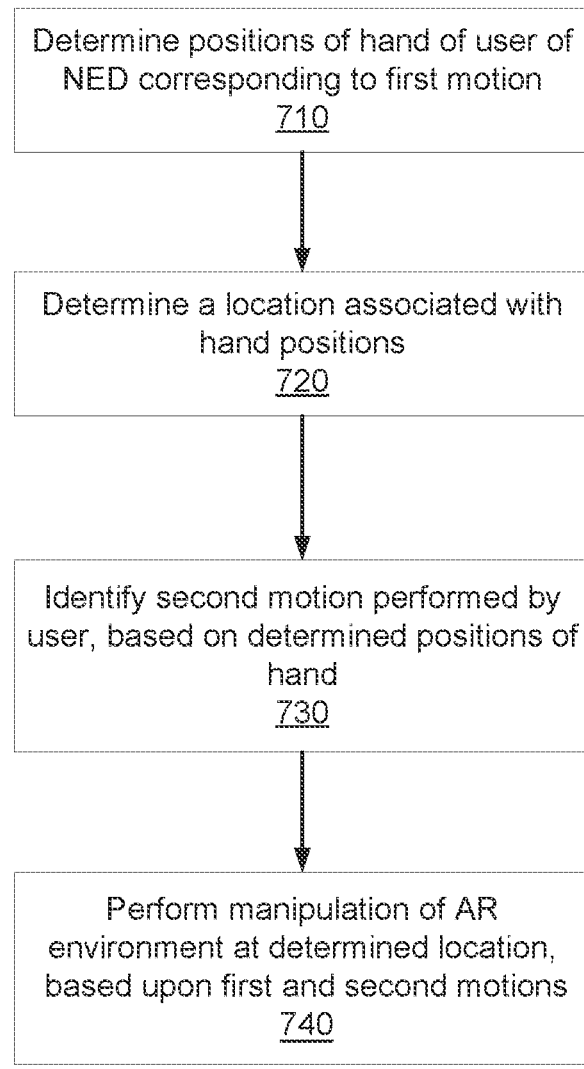
FIG. 7 illustrates a flowchart of an example process for casting a virtual object corresponding to a content item using a dartboard gesture, in accordance with one or more embodiments.
Figure 8A:
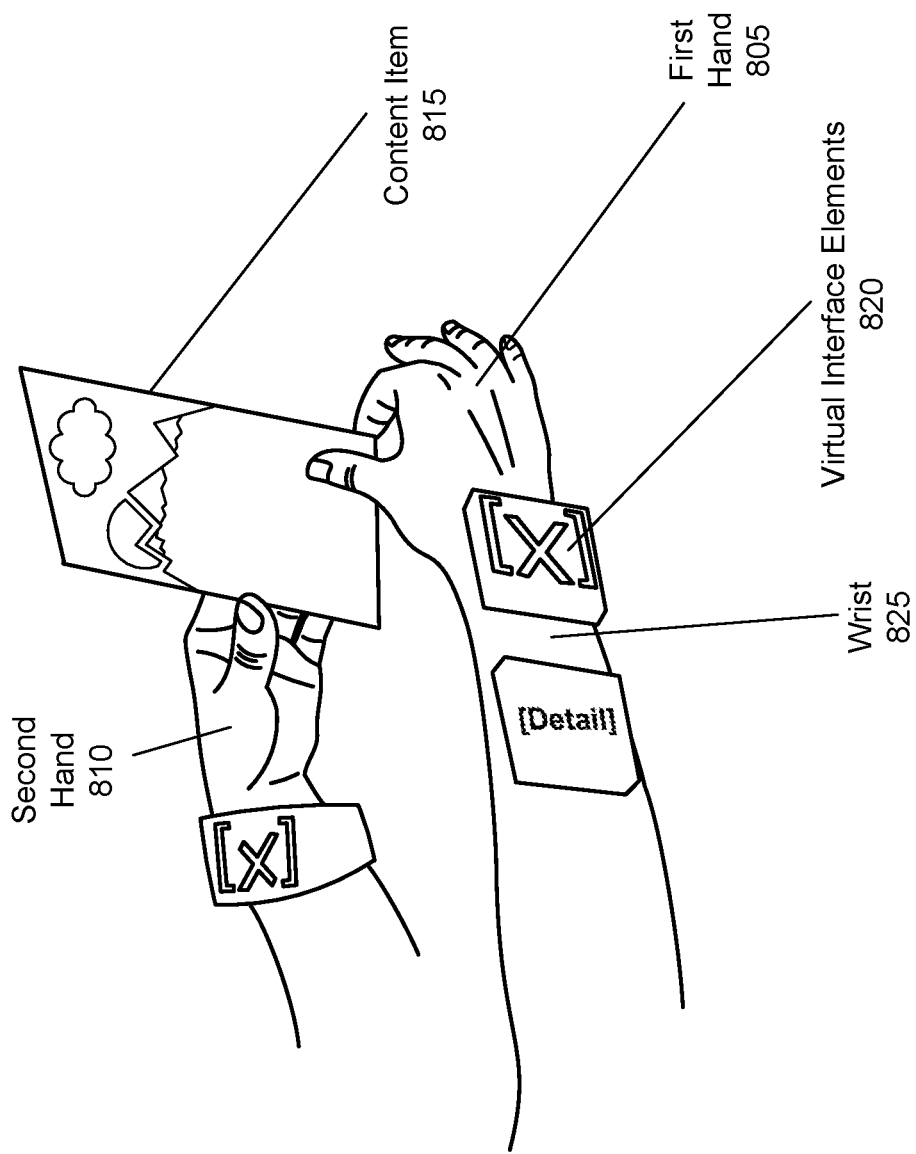
FIG. 8A illustrates a virtual interface elements in AR environment where the user is "holding" a virtual object corresponding to a content item, in accordance with one or more embodiments.
Figure 8B:
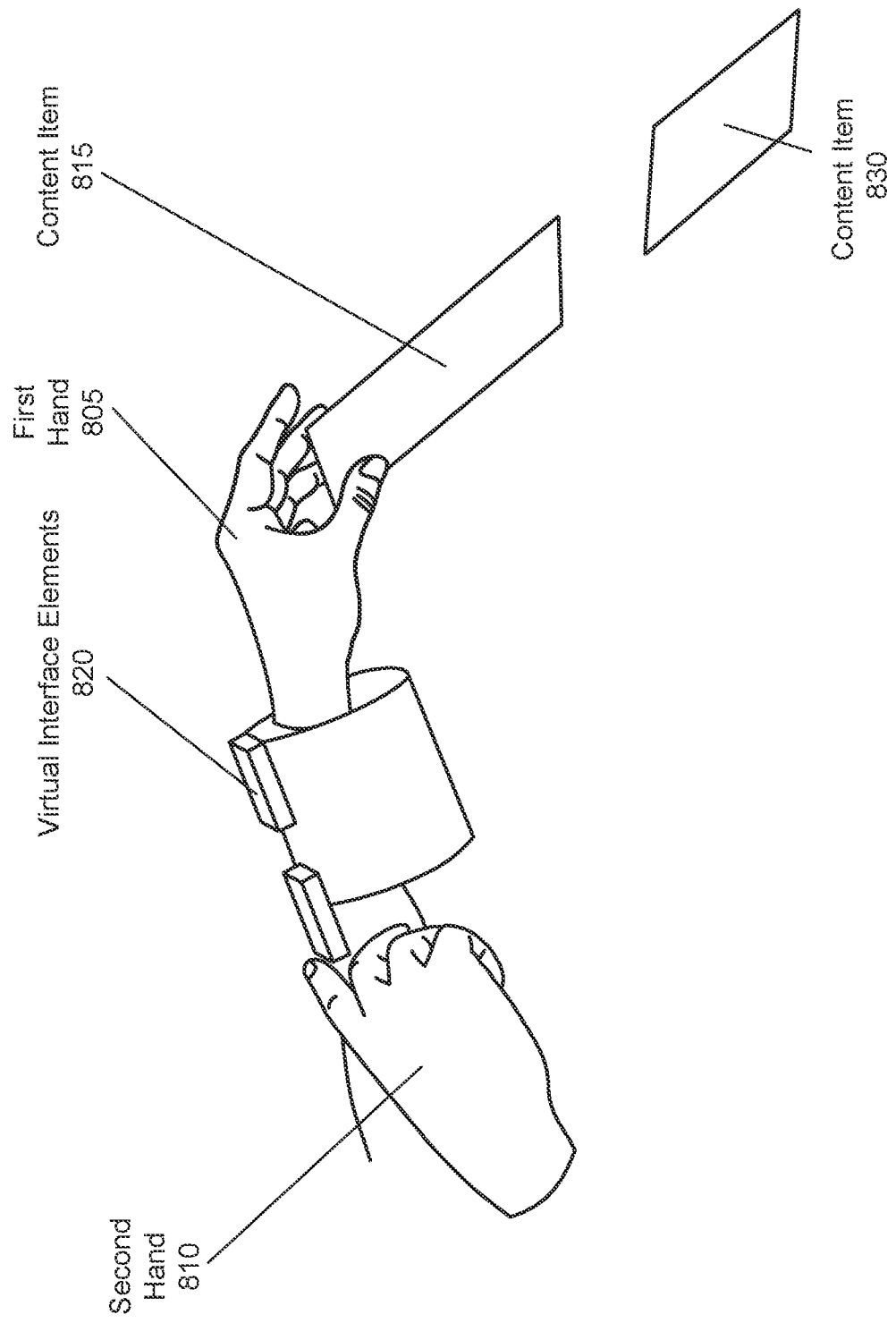
FIG. 8B illustrates the AR environment where the user manipulates the held virtual object using the virtual interface elements, in accordance with one or more embodiments.

The execution engine 385, in response to receiving from the tracking module 360 an indication of certain gestures, may execute certain instructions related to one or more of the recognized objects. This may allow for the user to select and manipulate various virtual objects in the AR environment intuitively through the use of gestures. For example, the user may select a virtual object corresponding to a content item (e.g., a representation of a content item) within the AR environment using a pinching or grabbing gesture, cast the virtual object onto different locations of the AR environment, share the content associated with the virtual object with other users, and/or manipulate the virtual object using one or more virtual interface elements. In some embodiments, the instructions may be further based upon an eye-gaze direction of the user (as determined by the eye tracker 325), transcribed speech of the user or other individual in the local area (as determined by the speech recognition module 370), and/or some combination thereof. Additional examples of such gestures are described with further detail below with reference to FIGS. 4-8B. FIGS. 4-5 describe gestures for selecting virtual interface objects on a displayed virtual menu. FIGS. 6A-6B and 7 describe a "dartboard" gesture used to display virtual objects at cast targets within the local area. FIGS. 8A-8B describe gestures for manipulating a displayed virtual object via virtual interface elements.

Although the description below is made primarily with reference to an artificial reality (e.g., an augmented reality) environment, the method described herein can also be applied to a virtual reality environment as well. In the virtual reality environment, the user wears a head mounted device that has an electronic display that does not allow light from the local area to strike the user's eyes. Instead, the user's view includes only what is displayed by the electronic display. In such a case, the eye gaze of the user may be towards a virtual object rather than an object in the local area, and the user may see a virtual representation of his or her hands in the virtual reality environment instead of his or her actual hands.

Virtual Interface in AR

In some embodiments, a near eye display (NED) system (e.g., NED system 300) having object recognition and gesture tracking capabilities may allow the NED system 300 to perform manipulations of the AR environment based upon detected user hand gestures. In some embodiments, the NED 305 presents a user of the NED system with a virtual interface in the AR environment, which may be manipulated by the user using hand gestures.

FIG. 4 illustrates an example of a virtual menu that may be displayed to a user by an eyewear device 410, according to an embodiment. The view in FIG. 4 is of the eyewear device 410 and the AR environment. In one embodiment, the eyewear device 410 includes the NED system 300 described with reference to FIG. 3, and thus includes the controller 310, optical assembly 365, and so on. In other embodiments, the eyewear device 410 corresponds to the NED 305 illustrated in FIG. 3, and does not include the controller 310. The optical assembly 365 of the eyewear device 410 may display the virtual menu 430 in the artificial environment to the user.

The virtual menu 430 is represented here by a ring of circular objects, with each circle representing a virtual menu option. However, in other embodiments, they may take on other shapes and features. For example, they could be spheres, cubes, text, or shaped (e.g., skeuomorphically) like real-world objects such as buttons, etc.

The controller 310 may further detect that the user's hand 440 is performing a touch gesture with one of the virtual menu options. A touch gesture is detected when the controller 310 detects that the distal end of one of the user's fingers is within a threshold distance of one of the virtual menu options (e.g., 2 mm) in the artificial reality environment. Once the touch gesture is detected, the controller 310 may execute an option corresponding to the selected or touched virtual menu option.

In some embodiments, the controller 310 is configured to be able to identify different types of gestures that may be performed by the user. As used herein, a "gesture" may refer to any series of one or more movements or positions of the user's hand 440 able to be identified or categorized by the controller 310. In some embodiments, a gesture comprises a sequence of multiple motions of the user's hand 440. In some embodiments, a gesture also corresponds to a particular position or orientation of the user's hand 440. The controller 310 may, in response to an identified gesture, execute one or more operations manipulating the artificial reality environment, based upon the specific gesture identified. As used herein, motions or positions of the user's hand may encompass particular motions or positions of the fingers/digits of the user's hand.

In some embodiments, the controller 310 detects a pinch-pull gesture with one of the virtual menu options. The pinch-pull gesture is detected when the distal ends of the user's index finger and thumb are within a threshold distance of each other (e.g., 5 mm) and they surround one of the virtual menu options. Furthermore, the user's hand moves in a direction towards the eyewear device 410 (i.e., that reduces the distance between the user's hand and the eyewear device). This type of gesture may be used for a virtual menu option that indicates a status indicator for the user. Upon detecting such a gesture, the controller 310 may apply the status indicator indicated by the selected virtual menu option to the user. For example, the virtual menu option may indicate a status indicator of "busy." If the user pinches this option and pulls it towards the user, the controller 310 may apply the "busy" status indicator to the user, and transmit this status to an online system. In some embodiments, other users with eyewear devices can subsequently see this updated status (which may be updated in real time) for the user. In other embodiments, the virtual menu options are used to manipulate the AR environment displayed to the user, such as by displaying a content item corresponding to the virtual menu option, perform an operation corresponding to the virtual menu option on a displayed content item, and/or the like.

FIG. 5 is a flowchart of an example process for manipulating an artificial reality environment based upon identified gestures, in accordance with one or more embodiments. As discussed above, in some embodiments, a NED system (e.g., the NED system 300) may comprise an imaging device (e.g., imaging device 315) or other type of sensor able to capture a representation of the user's hands over time for use in tracking the user's hands. A controller (e.g., the controller 310) may perform one or more manipulations of the artificial reality environment displayed to the user through the eyewear device, based upon the tracked position and movement of the user's hands (e.g., using the tracking module 360).

The controller determines 510 a position of a hand of the user associated with the NED system. In some embodiments, the position of the hand determined by the controller may comprise a position of the user's hand relative to the user's body, a position of the user's hand relative to their other hand, a position of the fingers of the user's hand(s), or any combination thereof.

The controller identifies 520 a first gesture, based upon a first set of determined hand positions. In some embodiments the controller tracks the position of the user's hand over time to determine a movement of the user's hand. The first gesture may correspond to a sequence of one or more determined movements of the user's hand. In some embodiments, the controller identifies a pulling gesture or a pushing gesture when it detects movement of the user's hand on a path towards or away from the user's body, respectively.

The first gesture may be identified based upon a determined position or pose of the user's hand(s). In an embodiment, the controller, in response to determining that the user's hands are on either side of their body, with their palms turned upwards, identifies a shrug gesture.

In some embodiments, identifying the first gesture comprises identifying that the user's hand moves to a particular location relative to a real-world object (e.g., the user's body or some other object within the local area) or a virtual object displayed in the artificial reality environment during a particular portion of the gesture, and/or achieves a particular pose at the particular location. In some embodiments, the controller, as part of identifying a pulling gesture, determines that the position of the user's hand at the start of the pulling gesture corresponds to a particular displayed virtual object.

The controller performs 530 a manipulation of the artificial reality environment, based upon the identified gesture. In some embodiments, the controller causes the eyewear device to display a new virtual object as part of the artificial reality environment, change an existing virtual object (e.g., how the virtual object is displayed, and/or a setting of the virtual object), and/or the like. In some embodiments, the controller, in response to the identified gesture, changes a setting associated with the NED system 300 (e.g., a status of the user, a setting of a piece of data associated with the user, and/or the like), communicate with another system (e.g., through the communication module 375) such as a controller associated with a real-world object in the local area or another NED system 300, and/or the like. In some embodiments, the manipulation is based upon a position of the user's hand a particular point in time during the gesture (e.g., in relation to a virtual object, a real-world object, and/or the like). Examples of specific gestures and their effects are described in greater detail below.

Casting Virtual Content Items Dartboard Gestures

In some embodiments, different types of gestures may be used to display and manipulate virtual objects displayed to a user in the AR environment. For example, in some embodiments, the user of a NED system (e.g., NED system 300) may perform a dartboard gesture to place or "cast" a displayed virtual object in the AR environment onto a target location.

FIGS. 6A and 6B illustrates an example of a user of a NED system being able to pick and place virtual objects using a dartboard gesture, in accordance with some embodiments. FIG. 6A illustrates the user performing a first part of the dartboard gesture to prepare to cast a virtual object onto a cast target. As used herein, a dartboard gesture may refer to a gesture comprising a first motion where the user's hand moves in a backwards (i.e., posterior) direction relative to the user's body at shoulder height or above, followed by a second motion where the user's hand moves in a forward (i.e., anterior) direction relative to the user's body at shoulder height or above. In some embodiments, the dartboard gesture may require that the fingers of the user's hand be in a certain position (e.g., as if pinching or grabbing a virtual object during the backwards motion, and spreading apart as if releasing the virtual object during the forwards motion). In addition, the user's hand may be required to have the palm facing upwards and elbow facing downwards during the backwards motion, while having the palm facing away from the user's body during the forward motion. In some embodiments, the dartboard gesture requires that the first or second motion have at least a threshold speed or range of movement. In some embodiments, the first or second motions may reach at certain position relative to the user's body, such as behind the user's ear.

The user of the NED system may be able to access, view, and manipulate different virtual objects corresponding to content items (e.g., images, videos, and/or the like). In order to organize the virtual objects displayed in the AR environment, the user may wish to be able to place virtual objects corresponding to different content items onto different locations in the AR environment. For example, as illustrated in FIG. 6A, the AR environment may contain cast targets 605 onto which the user may place various virtual objects, allowing the user to organize the virtual objects and view multiple virtual objects corresponding to different content items at once. Each cast target 605 corresponds to a boundary defining an area within the AR environment viewed by the user through the NED 305, and may be marked by a virtual boundary (e.g., a dotted line) displayed in the AR environment enclosing the area corresponding to the cast target 605. In other embodiments, the NED system identifies surfaces in the local area (e.g., walls, tables, etc.) onto which the user may "cast" one or more content items.

In some embodiments, a content item may be initially displayed as a virtual object 610 at a first location within the AR environment. The user may perform a "pinching" gesture in order to "pinch" the virtual object corresponding to content item, in which the user may move their hand near the displayed virtual object 610 and close their fingers over a portion of the virtual object 610 (e.g., a corner of the virtual object 610) such that the distal ends of their index finger and thumb are within a threshold distance and on opposite sides of a portion of the virtual object 610. In response to detecting the performed gesture, the NED system displays the virtual object 610 at a particular location relative the user's hand (e.g., such that a portion of the virtual object 610 appears between the user's index finger and thumb, to appear as being "pinched" by the user), and moves the virtual object 610 in accordance with the movements of the user's hand so long as the user continues to "pinch" the virtual object 610. Thus, the virtual object 610 is displayed to remain in the same location relative to the user's hand 615 (e.g., between the distal ends of the user's index finger and thumb) as the user's hand 615 moves as if travelling with the user's hand 615.

In FIG. 6A, the user has performed a "pinching" gesture with the virtual object 610 using her hand 615, and has performed a first motion with her hand 615, corresponding to a first backwards motion 620 relative to the body of the first user (e.g., towards the dorsal side of the first user). Because the virtual object 610 has been pinched by the user, the virtual object 610 may move with the user's hand 615 during performance of the backwards motion 620. The NED system 300, in response to identifying the first backwards motion, may identify a trajectory 625 associated with the motion 620, and a cast target 630 of the plurality of cast targets 605 corresponding to the trajectory 625. The identified trajectory 625 may be based on a portion of the path traveled by the hand 615 over the course of the motion 620 (e.g., in a direction opposite of the path of the motion 620). In some embodiments, the trajectory 625 may instead be based upon a determined gaze direction of the user, as determined by the eye tracker 325 (e.g., aligned with the gaze direction), and/or a head direction or head gaze of the user, as determined by a head tracking sensor (not shown). The identified cast target 630 corresponds to a cast target displayed over an area of the AR environment that intersects the trajectory 625 or an extension of the trajectory 625. The NED system 300 may change how the identified cast target 630 is displayed in the AR environment (e.g., illustrated in FIG. 6A with a thicker dotted-line border) in order to indicate that the cast target 630 corresponds to the identified trajectory 625 and has been "selected."

In some embodiments, instead of selecting the cast target 630 from a plurality of virtual cast targets 605, the NED system 300 may identify the cast target 630 corresponding to the trajectory 625 based upon one or more objects in the local area (e.g., a location where the identified trajectory 625 intersects a wall or other surface) and displays a visual indicator (e.g., a target symbol) at the identified location in the AR environment. The cast target 630 may correspond to a location on a surface of an object in the local area, such as a table or wall, which intersects the trajectory 625 or an extension of the trajectory 625. In some embodiments, the cast target 630 may be identified based upon objects of the local area if there are no cast targets 605 in the AR environment that intersect the trajectory 625 (or its extension).

FIG. 6B illustrates the user performing a second part of the dartboard gesture to cast the virtual object onto the target location (e.g., the identified cast target), in accordance with some embodiments. As illustrated in FIG. 6B, the user performs a second motion 635, which corresponds to moving the user's hand 615 in a forward direction relative to the user's body. In some embodiments, the second motion 635 travels along a path that is within a threshold angle from the opposite direction of the motion 620. In addition, the user, as part of the second motion 635, may change the positions of their fingers to signify "releasing" or "letting go" of the virtual object 610, in which the palm of the user's hand 615 faces in a direction radiating away from the user's body, and the distal ends of the user's thumb and index fingers are separated by at least a threshold distance. In some embodiments, when the user releases the virtual object 610, the virtual object 610 may be displayed moving away from the user's hand, as if thrown by the user.

The NED system 300 may, in response to detecting the second motion 630, display the virtual object 610 in the AR environment at the identified cast target 630. For example, the NED system 300 may display the virtual object 610 on the cast target 630, the virtual object 610 sized to fill the area of cast target 630 in at least one dimension. In embodiments where the NED system 300 identifies the cast target 630 on a surface within the local area, the NED system displays the virtual object 610 at the location of the cast target 630 on the surface within the AR environment with a predetermined size, or a size based upon a size of the surface. In some embodiments, the user may be able to cast multiple virtual objects 610 onto the same surface within the local area. As the virtual objects are cast onto the surface, the layout of the virtual objects cast onto the surface may change in order to accommodate the virtual objects displayed on the surface. In some embodiments, one or more cast targets 630 may be dynamically displayed on the surface in the local area, indicating the layout of how the virtual object 610 would be displayed if cast onto the surface. The cast targets 630 on the surface may be automatically adjusted as additional virtual objects are cast onto the surface, allowing for the surface to fit multiple casted virtual objects.

As such, through the performance of dartboard gestures, the user can cast various virtual objects corresponding to content items onto different locations within the AR environment, allowing the user to view and organize multiple content items. In some embodiments, once the user has cast one or more virtual objects, the user may perform one or more manipulations on the virtual objects (e.g., pick up and move the virtual objects between cast targets, resize the displayed virtual objects, delete one or more virtual objects, and/or the like). In some embodiments, when the virtual object 610 is displayed on the cast target 605, the NED system 300 may display one or more interface elements 640 on or near the virtual object 610, allowing for the user to perform manipulations on the virtual object 610 using the interface elements 640.

In some embodiments, the user, after casting one or more virtual objects onto locations in the AR environment, may remove a casted virtual object from its cast target using one or more gestures. For example, the user may select a casted virtual object based upon a pointing direction (e.g., by pointing with their hand towards the intended virtual object), a gaze direction (e.g., as determined by the eye tracker 325), a head direction (e.g., as determined by a head tracking sensor), or some combination thereof. Once the virtual object has been selected, the user may remove the virtual object from its cast target by performing a "pinch" gesture on the virtual object and moving their hand in a backwards (i.e. posterior) direction while pinching the virtual object. In some embodiments, the user may perform the "pinch" gesture to select and pinch the virtual object without having to first separately select the virtual object.

FIG. 7 illustrates a flowchart of an example process for casting a virtual objects using a dartboard gesture, in accordance with some embodiments. The NED system 300 determines 710 a set of positions of a hand of the user of the NED 305, with the set of positions corresponding to a first backwards motion that may be part of a dartboard gesture as described above. The first motion may also comprise the user "pinching" a particular virtual object displayed by the NED 305 in an AR environment.

The NED system 300 determines 720 a location in the AR environment based upon the determined hand positions of the user. In some embodiments, the location is determined based upon a trajectory of the first motion performed by the user, and may correspond to a cast target or a location on a surface within the local area.

The NED system 300 identifies 730 a second motion performed by the user, based upon the determined hand positions of the user. The second motion may correspond to the forward motion of a dartboard gesture as described above.

The NED system 300 manipulates 740 the AR environment at the determined location, based upon the identified first and second gestures (which collectively form a dartboard gesture). In some embodiments, the NED system 300, in response to identifying a dartboard gesture, displays a virtual objects at the determined location (e.g., within a cast target).

Other Gestures

FIGS. 8A and 8B illustrate an example of other types of gestures that may be performed by the user of an NED system to manipulate content items in the AR environment displayed by the NED system, in accordance with some embodiments. FIG. 8A illustrates an AR environment where the user is "holding" a content item, in accordance with some embodiments. As illustrated in FIG. 8A, the user may "hold" a content item 815 by performing a "pinch" gesture with her hands 805 or 810 to hold the content item 815 (e.g., a virtual object). When the user holds the content item 815, the NED system displays the content item 815 at a location corresponding to the fingers of the user's hands 805 or 810 such that a portion of the content item 815 is displayed between the distal ends of the user's thumb and index finger, indicating that the content item 815 is being held by the user. In some embodiments, the user performs a "pinch" gesture with both hands, whereupon the content item 815 is displayed such that a respective portion of the content item 815 is located between the thumb and index fingers of each of the user's hands. If the user stops performing the "pinch" gesture with one hand, the content item 815 may be displayed to continue to be held by the user's other hand, and displayed such that its position relative to the user's other hand remains unchanged relative to the user's other hand moves, as long as the user maintains the "pinch" gesture with their other hand.

The NED system 300 displays one or more virtual interface elements 820 within the AR environment that may be used by the user to manipulate the content item 815. In some embodiments, the virtual interface elements 820 are displayed on a dorsal surface of the wrist 825 of the user, and may comprise elements that, when interacted with by the user's other hand (e.g., hand 810), delete the content item 815, display additional data relating to the content item 815, and/or perform other functions on the content item 815. In some embodiments, the user may use their hand 810 to interact with one of the virtual interface elements 820 by performing a "push" gesture, in which the user extends an index finger of their hand 810 along a path that moves the distal end of the user's index finger to within a threshold distance to a virtual interface element 820, with the index finger remaining within the threshold distance for at least a threshold period of time. In some embodiments, the virtual interface elements 820 are displayed on the surfaces of the wrists of both hands of the user, allowing the user to be able to manipulate the virtual interface elements 820 with either hand.

In some embodiments, the virtual interface elements 820 are displayed only when the user is "holding" a content item as described above, such that the operations associated with the virtual interface elements 820 will, when selected by the user, be performed on the content item 815 currently being held by the user. The virtual interface elements 820 may comprise a first virtual interface element, shown as an "X" in the figure, that when interacted with by the user using a gesture, causes the NED system 300 to delete the content item 815 virtual object from the AR environment, and a second virtual interface element, shown as the label "Detail", in the figure, that when interacted with by the user using a gesture, causes the NED system 300 to display supplemental data associated with the content item 815.

FIG. 8B illustrates the AR environment where the user manipulates the held content item virtual object 815 using the virtual interface elements 820, according to one or more embodiments. As discussed above, the user may continue holding the content item 815 by continuing to maintain the "pinch" gesture with the one hand 805, while their other hand 810 releases the content item 815. The user may move her other hand 810 to a location in the AR environment corresponding to one of the virtual interface elements 820. The NED system 300 may, in response to detecting that a distal end of the user's extended index finger of their hand 810 correspond to one of the virtual interface elements 820, perform the action corresponding to the virtual interface element 820 on the held content item 815. For example, the user may activate the virtual interface element labelled "Details," causing the NED system 300 to display a content item 830 (e.g., a virtual object) adjacent to the held content item 815 that comprises an image displaying data associated with the content item 815. As illustrated in FIG. 8B, the content item 830 may be displayed on a common plane as the content item 815.

As such, the user is able to select and manipulate various content items in the AR environment intuitively through the use of gestures. For example, the user may select a virtual object corresponding to a content item by pinching or grabbing it within the AR environment, cast the virtual object onto different locations of the AR environment, share the content associated with the virtual object with other users, and/or manipulate the virtual object using one or more virtual interface elements.

FIGS. 9A and 9B illustrate an example of a user performing a slice gesture in order to access a menu in the AR environment, in accordance with some embodiments. In some embodiments, a menu containing interactive virtual interface elements is not initially displayed in the AR environment, but can be displayed in response to one or more predetermined gestures performed by the user. For example, a menu associated with a virtual object is not initially displayed with the virtual object in order to reduce clutter around the virtual object in the AR environment. In some embodiments, a menu may not be associated with any particular virtual objects. For example, a menu may comprise an album of content items from which the user may select and cast into the AR environment as virtual objects. The menu may initially not be displayed in the AR environment, and instead is displayed in response to the user performing a predetermined gesture, allowing for the user to control when the menu is displayed in the AR environment. As used herein, a "menu" may refer to a set of interactive virtual interface elements arranged in a preconfigured format, the interactive virtual interface elements usable by the user to perform operations or manipulations on a virtual object within the AR environment.

FIG. 9A illustrates the user performing a "slice" gesture to cause a menu to be displayed in the AR environment, in accordance with some embodiments. A "slice" gesture may comprise the user's hand 905 moving over a substantially linear path 910 extending in a particular direction (e.g., a downward direction relative to the user's body, as illustrated in FIG. 9A) over at least a threshold distance and at least a threshold rate. For example, a slice gesture may require the user's hand to move over a downwards trajectory spanning a distance of at least 9 inches over no more than half a second.

In some embodiments, in order to perform the "slice" gesture, the fingers of the user's hand may remain in a particular position throughout the performance of the gesture. For example, the user may be required to extend at least two fingers 915 (e.g., the index and middle fingers) of the hand 905, where the fingers 915 are held together by the user throughout the performance of the gesture. In some embodiments, the path 910 is defined by a movement along a point at the tip of the user's extended fingers 915.

In some embodiments, the user may first select a virtual object displayed in the AR environment (e.g., based upon a gaze direction or a previous gesture) before performing the "slice" gesture, whereupon the NED system displays a menu corresponding to the selected virtual object responsive to performance of the gesture. In embodiments where the menu is not associated with a displayed virtual object, the user may first select the menu (e.g., using a mobile device, through interactions with a different menu, and/or the like) before performing the "slice" gesture, which causes the selected menu to be displayed in the AR environment.

FIG. 9B illustrates a menu containing interface virtual interface elements being displayed to the user following performance of the "slice" gesture, in accordance with some embodiments. Once the user has performed the "slice" gesture, the NED system 300 displays the menu 920 at a location in the AR environment associated with the performed gesture. For example, the menu 920 may be displayed such that a center line of the menu 920 substantially coincides with the path 910 of the performed "slice" gesture.

The menu 920 comprises a plurality of interactive virtual elements 925. The interactive virtual elements 925 may comprise buttons, dials, and or other elements that may be manipulated by the user in the AR environment. For example, as discussed above, the user may interact with a displayed button element by moving a hand moving to a location associated with the button element to press the button.

In some embodiments, the interactive virtual elements 925 may comprise one or more content items. For example, as illustrated in FIG. 9B, the menu 920 may comprise an album of content items that the user may view, interact with, and/or cast into the AR environment. For example, the user may use a "pinch" gesture to select a particular content item, which the user may then cast onto a cast target as discussed above. In other embodiments, the user may perform a "pinch" gesture to select a particular content item and move the content item within the AR environment. When the user stops performing the "pinch" gesture, the content item may be displayed as a virtual object at the location it was in when the user stopped performing the "pinch" gesture, at a location of a nearest cast target or surface, and/or the like.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system comprising:
   a near eye display (NED) comprising:
     an optical assembly having an electronic display that is configured to display images in accordance with display instructions;
     an imaging device configured to capture one or more images of a portion of a local area of the NED; and
   a controller configured to:
     determine that a first hand and a second hand of a user of the NED located within the local area are performing a pinch gesture, using the captured one or more images, wherein the pinch gesture comprises, for each hand, a distal end of an index finger and a distal end of a thumb of the hand oriented to be within a threshold distance of each other;
     in response to determining that the first hand and the second hand are performing the pinch gesture, update the display instructions to cause the electronic display to:
       display a first content item at a position between the distal end of the index finger and the distal end of the thumb of each hand, such that the first content item moves in conjunction with movement of the first and second hands and the first content item appears to be held between the index finger and the thumb of both hands;
     determine that the second hand is no longer performing the pinch gesture;

in response to determining that the second hand is no longer performing the pinch gesture, update the display instructions to cause the electronic display to:
continue display of the first content item at a position between the distal end of the index finger and the distal end of the thumb of the first hand;
update the display instructions to cause the electronic display to display a set of virtual interface elements at predetermined locations relative to the user's body, wherein each of the set of virtual interface elements is associated with a corresponding action able to be performed on the first content item;
detect a subsequent gesture performed by the second hand of the user to interact with a first virtual interface element of the set of virtual interface elements, the subsequent gesture taking place after the second hand is no longer performing the pinch gesture; and
in response to detecting the subsequent gesture performed by the second hand, update the display instructions to cause the electronic display to perform a first action corresponding to the first virtual interface element on the first content item.

2. The system of claim 1, wherein the first content item is a planar virtual object.

3. The system of claim 1, wherein a corresponding action includes removing the first content item from display.

4. The system of claim 1, wherein a corresponding action includes causing display of additional data relating to the first content item.

5. The system of claim 4, wherein the first content item is displayed as a virtual object defining a first plane, and the additional data relating to the first content item is displayed as a second virtual object on the first plane.

6. The system of claim 1, wherein the subsequent gesture performed by the second hand of the user to interact with the first virtual interface element of the set of virtual interface elements comprises the user extending an index finger of the second hand and moving the second hand along a path such that a distal end of the index finger is within a threshold distance to the first virtual interface element, with the index finger remaining within the threshold distance for at least a threshold period of time.

7. The system of claim 1, wherein the set of virtual interface elements is displayed on a surface of a wrist of the first hand of the user.

8. The method of claim 6, wherein the set of virtual interface elements is displayed on a surface of a wrist of the first hand of the user.

9. A method comprising:
capturing, using an imaging device, one or more images of a portion of a local area of a near eye display (NED);
determining that a first hand and a second hand of a user of the NED located within the local area are performing a pinch gesture, using the captured one or more images, wherein the pinch gesture comprises, for each hand, a distal end of an index finger and a distal end of a thumb of the hand oriented to be within a threshold distance of each other;
while the first hand and the second hand of the user are determined to maintain the pinch gesture:
displaying, using an electronic display of the NED configured to display images to the user, a first content item at a position between the distal end of the index finger and the distal end of the thumb of each hand, such that the first content item moves in conjunction with movement of the first and second hands and the first content item appears to be held between the index finger and the thumb of both hands;
determining that the second hand is no longer performing the pinch gesture;
while the first hand of the user is determined to maintain the pinch gesture:
displaying the first content item at a position between the distal end of the index finger and the distal end of the thumb of the first hand;
displaying a set of virtual interface elements at predetermined locations relative to the user's body, wherein each of the set of virtual interface elements is associated with a corresponding action able to be performed on the first content item;
determining that the second hand is performing a subsequent gesture to interact with a first virtual interface element of the set of virtual interface elements, the subsequent gesture taking place after determining that the second hand is no longer performing the pinch gesture; and
performing a first action corresponding to the first virtual interface element on the first content item.

10. The method of claim 9, wherein the first content item is a planar virtual object.

11. The method of claim 9, wherein a corresponding action includes removing the first content item from display.

12. The method of claim 9, wherein a corresponding action includes causing display of additional data relating to the first content item.

13. The method of claim 12, wherein the first content item is displayed as a virtual object defining a first plane, and the additional data relating to the first content item is displayed as a second virtual object on the first plane.

14. The method of claim 9, wherein the subsequent gesture performed by the second hand of the user to interact with the first virtual interface element of the set of virtual interface elements comprises the user extending an index finger of the second hand and moving the second hand along a path such that a distal end of the index finger is within a threshold distance to the first virtual interface element, with the index finger remaining within the threshold distance for at least a threshold period of time.

15. A non-transitory computer readable medium storing instructions that, when executed by a processor, cause the processor to perform steps comprising:
capturing, using an imaging device, one or more images of a portion of a local area of a near eye display (NED);
determining that a first hand of a user of the NED located within the local area is performing a pinch gesture, using the captured one or more images, wherein the pinch gesture comprises the first hand of the user oriented such that a distal end of an index finger and a distal end of a thumb are within a threshold distance of each other;
while the first hand of the user is determined to maintain the pinch gesture:
displaying, using an electronic display of the NED configured to display images to the user, a first content item at a position between the distal end of the index finger and the distal end of the thumb, such that the first content item moves in conjunction with movement of the first hand and the first content item appears to be held between the index finger and the thumb;

determining that a second hand of the user is performing a pinch gesture concurrently with the first hand of the user;

displaying the first content item such that a first portion of the first content item is displayed at the position between the distal end of the index finger and the distal end of the thumb of the first hand, and a second portion of the first content item is displayed at a position between a distal end of an index finger and a distal end of a thumb of the second hand, such that the first content item appears to be held between the index finger and the thumb of both the first and second hands;

displaying a set of virtual interface elements at predetermined locations relative to the user's body, wherein each of the set of virtual interface elements is associated with a corresponding action able to be performed on the first content item;

determining that the second hand of the user is no longer performing the pinch gesture;

continuing display of the first content item such that the first portion of the first content item is displayed at the position between the distal end of the index finger and the distal end of the thumb of the first hand;

detecting, concurrent to the first hand maintaining the pinch gesture, a gesture performed by the second hand of the user to interact with a first virtual interface element of the set of virtual interface elements, based upon the captured one or more images; and performing a first action corresponding to the first virtual interface element on the displayed first content item.

* * * * *

UNITED STATES PATENT AND TRADEMARK OFFICE
CERTIFICATE OF CORRECTION

Page 1 of 1

PATENT NO. : 11,157,725 B2
APPLICATION NO. : 16/819938
DATED : October 26, 2021
INVENTOR(S) : Andersen et al.

It is certified that error appears in the above-identified patent and that said Letters Patent is hereby corrected as shown below:

In the Claims

In Column 25, Claim 8, Line 48, delete "method of" and insert -- system of --, therefor.

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*